United States Patent
McCoy et al.

(10) Patent No.: US 10,054,724 B2
(45) Date of Patent: Aug. 21, 2018

(54) EXPOSED LENS RETROREFLECTIVE ARTICLES COMPRISING A SELF-ASSEMBLED DIELECTRIC MIRROR

(71) Applicant: 3M INNOVATIVE PROPERTIES COMPANY, St. Paul, MN (US)

(72) Inventors: Michael A. McCoy, St. Paul, MN (US); Daniel J. Schmidt, Woodbury, MN (US); Shri Niwas, Maple Grove, MN (US); Ying Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 15/504,037

(22) PCT Filed: Apr. 30, 2015

(86) PCT No.: PCT/US2015/028402
§ 371 (c)(1),
(2) Date: Feb. 15, 2017

(87) PCT Pub. No.: WO2016/039820
PCT Pub. Date: Mar. 17, 2016

(65) Prior Publication Data
US 2017/0276844 A1    Sep. 28, 2017

Related U.S. Application Data

(60) Provisional application No. 62/048,397, filed on Sep. 10, 2014.

(51) Int. Cl.
*G02B 5/128* (2006.01)
*G02B 5/08* (2006.01)
(Continued)

(52) U.S. Cl.
CPC ........ *G02B 5/128* (2013.01); *B29D 11/00615* (2013.01); *G02B 5/0825* (2013.01); *G02B 5/0883* (2013.01); *B82Y 30/00* (2013.01)

(58) Field of Classification Search
None
See application file for complete search history.

(56) References Cited

U.S. PATENT DOCUMENTS

| 770,082 A | 9/1904 | Linnekogel |
|---|---|---|
| 1,175,224 A | 3/1916 | Bleecker |

(Continued)

FOREIGN PATENT DOCUMENTS

| EA | 0683269 | 11/1995 |
|---|---|---|
| EP | 1431449 | 6/2004 |

(Continued)

OTHER PUBLICATIONS

Bae, "Fabrication of Antireflective Films Composed of High and Low Refractive Index Layers Using Layer-by-Layer Self-Assembly Method," Solid State Phenomena, 2007, vols. 124-126, pp. 559-562.

(Continued)

*Primary Examiner* — Jennifer D. Carruth

(57) ABSTRACT

An exposed lens retroreflective article (100), transfer articles comprising same, and methods of making same. The retroreflective article can include a binder layer (114); a layer of transparent microspheres (108) partially embedded in the binder layer; and reflective layer (110) disposed between the binder layer and the microspheres. The reflective layer (110) can include a dielectric mirror, which can include a first stack (115) and a second stack (111) positioned in planar contact with the first stack, wherein each of the first stack and the second stack comprises at least one bilayer (119), wherein each bilayer comprises a first material with a first bonding group and a second material with a complementary (Continued)

second bonding group. The transfer article can include the retroreflective article and a carrier web. The method can include partially embedding transparent microspheres in a carrier web; applying the reflective layer to the microspheres, and applying a binder layer composition to the reflective layer.

20 Claims, 4 Drawing Sheets

(51) Int. Cl.
*B29D 11/00* (2006.01)
*B82Y 30/00* (2011.01)

(56) References Cited

U.S. PATENT DOCUMENTS

| | | |
|---|---|---|
| 2,383,884 A | 8/1945 | Palmquist |
| 2,461,011 A | 2/1949 | Taylor |
| 2,543,800 A | 3/1951 | Palmquist |
| 2,555,715 A | 6/1951 | Tatum |
| 2,726,161 A | 12/1955 | Beck |
| 2,842,446 A | 7/1958 | Beck |
| 2,853,393 A | 9/1958 | Beck |
| 2,870,030 A | 1/1959 | Stradley |
| 2,939,797 A | 6/1960 | Rindone |
| 2,965,921 A | 12/1960 | Bland |
| 2,992,122 A | 7/1961 | Beck |
| 3,468,681 A | 9/1969 | Jaupain |
| 3,700,305 A | 10/1972 | Bingham |
| 3,946,130 A | 3/1976 | Tung |
| 4,102,562 A | 7/1978 | Harper |
| 4,192,576 A | 3/1980 | Tung |
| 4,367,919 A | 1/1983 | Tung |
| 4,564,556 A | 1/1986 | Lange |
| 4,567,228 A | 1/1986 | Gaa |
| 4,578,469 A | 3/1986 | Deger |
| 4,758,469 A | 7/1988 | Lange |
| 4,763,985 A | 8/1988 | Bingham |
| 4,772,511 A | 9/1988 | Wood |
| 4,931,414 A | 6/1990 | Wood |
| 4,950,525 A | 8/1990 | Bailey |
| 5,126,394 A | 6/1992 | Revis |
| 5,200,262 A | 4/1993 | Li |
| 5,283,101 A | 2/1994 | Li |
| 5,474,827 A | 12/1995 | Crandall |
| 5,554,686 A | 9/1996 | Frisch, Jr. |
| 5,620,613 A | 4/1997 | Olsen |
| 5,812,317 A | 9/1998 | Billingsley |
| 5,916,300 A | 6/1999 | Kirk |
| 5,988,821 A | 11/1999 | Tanaka |
| 6,046,295 A | 4/2000 | Frisch, Jr. |
| 6,153,128 A | 11/2000 | Lightle |
| 6,316,084 B1 | 11/2001 | Claus |
| 6,361,850 B1 | 3/2002 | Billingsley |
| 6,376,590 B2 | 4/2002 | Kolb |
| 6,416,188 B1 | 7/2002 | Shusta |
| 7,111,949 B2 | 9/2006 | Parisi |
| 7,303,292 B2 | 12/2007 | Yukawa |
| 8,234,998 B2 | 8/2012 | Krogman |
| 8,256,025 B2 | 9/2012 | Feduzi |
| 8,274,727 B1 | 9/2012 | Yap |
| 8,313,798 B2 | 11/2012 | Nogueira |
| 8,446,666 B2 | 5/2013 | Kurt |
| 2002/0037364 A1 | 3/2002 | Fleming |
| 2003/0156331 A1 | 8/2003 | Oie |
| 2006/0148950 A1 | 7/2006 | Davidson |
| 2006/0188700 A1 | 8/2006 | Yukawa |
| 2010/0238552 A1 | 9/2010 | Tsai |
| 2011/0045176 A1 | 2/2011 | Koppes |
| 2011/0193335 A1 | 8/2011 | Budd |
| 2011/0292508 A1 | 12/2011 | Huang |
| 2013/0108784 A1 | 5/2013 | Koppes |
| 2013/0273242 A1 | 10/2013 | Krogman |
| 2014/0118827 A1* | 5/2014 | Zhang ............ G02B 5/136 359/518 |

FOREIGN PATENT DOCUMENTS

| | | |
|---|---|---|
| ES | 2061379 | 6/1995 |
| WO | WO 1994-013723 | 6/1994 |
| WO | WO 1997-001776 | 1/1997 |
| WO | WO 1997-015848 | 5/1997 |
| WO | WO 2000-050931 | 8/2000 |
| WO | WO 2000-079314 | 12/2000 |
| WO | WO 2011-147079 | 12/2011 |
| WO | WO 2013-052927 | 4/2013 |
| WO | WO 2014-099367 | 6/2014 |
| WO | WO 2014-150903 | 9/2014 |
| WO | WO 2014-193550 | 12/2014 |
| WO | WO 2015-095317 | 6/2015 |
| WO | WO 2015-171405 | 11/2015 |
| WO | WO 2015-171406 | 11/2015 |
| WO | WO 2016-033195 | 3/2016 |

OTHER PUBLICATIONS

Chopra, Thin Film Phenomena, 750 (1969).
Decher, "Fuzzy Nanoassemblies Toward Layered Polymeric Multicomposites," Science, Aug. 1997, vol. 277, pp. 1232-1237.
Dubas, "Polyelectrolyte Multilayers Containing a Weak Polyacid: Construction and Deconstruction," Macromolecules, Apr. 2001, vol. 34, No. 11, pp. 3736-3740.
"Elastomer" definition from "Hawley's Condensed Chemical Dictionary", R. J. Lewis Sr. Ed., 12th Ed., p. 455, Van Nostrand Reinhold Co., New York, N.Y. (1993).
Kim, "A Layer by Layer Self-Assembly Method for Organic-Inorganic Hybrid Multilayer Thin Films," Journal of Ceramic Processing Research, 2009, vol. 10, No. 6, pp. 770-773.
Krogman, "Automated Process for Improved Uniformity and Versatility of Layer-by-Layer Deposition," Langmuir, 2007, vol. 23, No. 6, pp. 3137-3141.
Krogman, "Industrial-Scale Spray Layer-by-Layer Assembly for Production of Biomimetic Photonic Systems" Bioinspiration & Biomimetics, vol. 8, 2013, pp. 11.
Kurt, "Structural Color Via Layer-by-Layer Deposition: Layered Nanoparticle Arrays with Near-UV and Visible Reflectivity Bands," Journal of Materials Chemistry, 2009, vol. 19, pp. 8920-8927.
Lindh, "The Salivary Mucin MUC5B and Lactoperoxidase Can Be Used for Layer-By-Layer Film Formation," Journal of Colloid and Interface Science, 2007, vol. 310, pp. 74-82.
Macleod, Thin Film Optical Filters, 184-205, (2001).
Nogueira, "Spray-Layer-By-Layer Assembly Can More Rapidly Produce Optical-Quality Multistack Heterostructures," Langmuir, 2011, vol. 27, pp. 7860-7867.
Nolte, "Creating Effective Refractive Index Gradients Within Polyelectrolyte Multilayer Films: Molecularly Assembled Rugate Filters," Langmuir, 2008, vol. 20, pp. 3304-3310.
Nuraje, "Durable Antifog Films From Layer-by-Layer Molecularly Blended Hydrophilic Polysaccharides," Langmuir, 2011, vol. 27, No. 2, pp. 782-791.
Schechter, MIT Scientists Turn Simple Idea Into 'Perfect Mirror', The New York Times, Dec. 15, 1998, [retrieved from the internet on Apr. 18, 2017]. URL <http://www.nytimes.com/1998/12/15/science/mit-scientists-turn-simple-idea-into-perfect-mirror.html>, 5 pages.
Seyrek, "Layer-by-Layer Assembly of Multifunctional Hybrid Materials and Nanoscale Devices," Polymer Science: A Comprehensive Reference, 2012, vol. 7.09, p. 159-185.
Shimomura "Layer-By-Layer Assembled High-Performance Broadband Antireflection Coatings," Applied Materials and Interfaces, 2010, vol. 2, No. 3, pp. 813-820.
"Technology Overview," Svaya Nanotechnologies (on line), [retrieved from the internet on May 11, 2013]. URL <http://www.svaya-nano.com/technology>, 1 page.

(56) References Cited

OTHER PUBLICATIONS

Wang, "Metallodielectric Photonic Structures Based on Polyelectrolyte Multilayers," Advanced Material, Nov. 2002, vol. 14, No. 21, pp. 1534-1537.
Wu "Structural Color in Porous, Superhydrophilic, and Self-Cleaning $SiO_2$/ $TiO_2$ Bragg Stacks," Small, 2007 vol. 3, No. 8, 1445-1451.
International Search Report for PCT International Application No. PCT/US2015/028402, dated Aug. 3, 2015, 4 pages.

\* cited by examiner

EXPOSED LENS RETROREFLECTIVE ARTICLES COMPRISING A SELF-ASSEMBLED DIELECTRIC MIRROR

CROSS REFERENCE TO RELATED APPLICATIONS

This application is a national stage filing under 35 U.S.C. 371 of PCT/US2015/028402, filed Apr. 30, 2015, which claims the benefit of Provisional Application No. 62/048,397. Filed Sep. 10, 2014, the disclosure of which is incorporated by reference in its/their entirety herein.

FIELD

The present disclosure generally relates to retroreflective articles, and particularly, exposed lens retroreflective articles, and more particularly to exposed lens retroreflective articles comprising a self-assembled dielectric mirror.

BACKGROUND

A wide variety of articles that incorporate the phenomenon of retroreflectivity have been developed for a wide array of uses. Retroreflective articles have the ability to return a substantial portion of incident light back towards the light source. This unique ability has promoted widespread use of retroreflective safety articles. Besides traffic and warning signs and the like, a wide variety of clothing and similar articles such as backpacks, and the like have incorporated retroreflective articles into them. Persons who work or exercise near motor vehicle traffic need to be conspicuously visible so that they do not get struck by passing motor vehicles. When retroreflective articles are worn, the retroreflectivity highlights a person's presence by retroreflecting light from motor vehicle headlamps.

Retroreflective articles generally include a polymeric binder layer, an optical lens element layer, and a reflective layer. For example, the optical lens element layer can be a layer of microspheres partially embedded in the binder layer, and the reflective layer can be disposed on the embedded portions of the microspheres. The reflective layer can be aluminum or silver (e.g., for applications requiring high reflectivity) or a dielectric mirror (e.g., for applications not requiring high reflectivity). Light striking the front surface of the retroreflective article passes through the microspheres and is reflected by the reflective layer to re-enter the microspheres where the light's direction is then altered to travel back towards the light source. Thus, for example, when a vehicle's headlamps strike a retroreflective article, some of the light from the headlamps is reflected back to the driver of the vehicle.

It is generally not necessary, or even desirable, that an entire worn article be retroreflective, so retroreflective appliqués can be used. These retroreflective appliqués can then be attached to an article of clothing or other article to prepare a retroreflective article. In some instances, retroreflective appliqués have been made by partially embedding a microsphere layer in a thermoplastic carrier web, applying a reflective material over the microspheres' protruding portions, and then forming a binder layer over the coated microspheres. A pressure sensitive adhesive can be applied on the binder layer's back surface, and a release liner can be placed over the adhesive until it is desired to apply the appliqué to a substrate. The completed appliqué (also sometimes referred to as a transfer article or transfer sheet) can be supplied to a garment assembler in this form, and the garment assembler can secure the appliqué to an article of clothing by removing the release liner and adhering the appliqué to an outer surface of the article of clothing. The carrier can then be separated from the appliqué to expose the microspheres so that the appliqué can retroreflect light.

A number of retroreflective articles have been prepared and described. For example, in U.S. Pat. No. 6,361,850 (Billingsley et al.), retroreflective articles are described employing a colored layer disposed between microspheres and a reflective layer. U.S. Patent Publication No. 2011/0292508 (Huang et al.) describes an exposed lens retroreflective articles that includes a binder layer, a layer of spaced apart microspheres that are partially embedded in the binder layer, a penetrated colored layer that is located between the spaced apart optical elements, and a reflective layer that is located functionally behind the layer of optical elements and the penetrated colored layer. U.S. Pat. No. 3,700,305 describes retroreflective constructions containing microspheres with adjacent dielectric mirrors.

Originally, retroreflective materials were generally all silver in color based on the metal reflective layer employed. As the need arose for retroreflective articles that were colored other than silver, the retroreflective nature of the articles suffered. Therefore, there remains a need for colored retroreflective articles that have increased retroreflective properties.

SUMMARY

Some aspects of the present disclosure provide an exposed lens retroreflective article. The retroreflective article can include a binder layer; a layer of transparent microspheres partially embedded in the binder layer; and a reflective layer disposed between the binder layer and the microspheres, the reflective layer comprising a dielectric mirror, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group.

Some aspects of the present disclosure can provide a transfer article. The transfer article can include a carrier web having a first major surface and a second major surface opposite the first major surface; a layer of transparent microspheres partially embedded in the first major surface of the carrier web; a reflective layer disposed over the microspheres and the first major surface of the carrier web, the reflective layer comprising a dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and a binder layer disposed over the reflective layer.

Some aspects of the present disclosure provide a method of making a retroreflective article. The method can include partially embedding a plurality of transparent microspheres in a carrier web; applying a dielectric mirror to the exposed portions of the microspheres to form a reflective layer, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and applying a binder composition to the reflective layer to form a binder layer.

Other features and aspects of the present disclosure will become apparent by consideration of the detailed description and accompanying drawings.

BRIEF DESCRIPTION OF THE DRAWINGS

The figures are generally schematic and not necessarily to scale.

DETAILED DESCRIPTION

Figure 1:
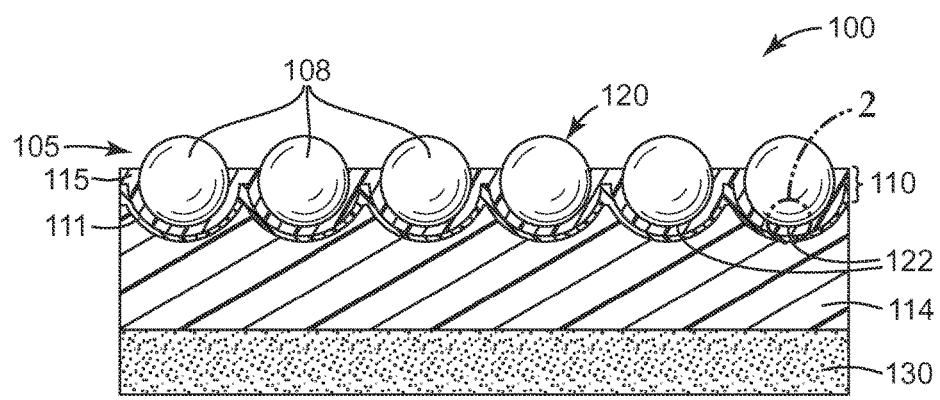
FIG. 1 is a side cross-sectional view of an exposed lens retroreflective article according to one embodiment of the present disclosure.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "supported," and "coupled" and variations thereof are used broadly and encompass both direct and indirect supports and couplings. Furthermore, terms such as "front," "rear," "top," "bottom," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to retroreflective articles comprising a self-assembled dielectric mirror, and particularly, to exposed lens retroreflective articles. In some embodiments, the dielectric mirror can be self-assembled by employing bilayers, each bilayer comprising a first layer of a first material with a first bonding group and a second layer of a second material with a second bonding group. In some embodiments, the dielectric mirror can include a polyelectrolyte. That is, in some embodiments, the first bonding group can be a first (poly)electrostatic charge (e.g., a (poly) cation), and the second bonding group can be a second (poly)electrostatic charge (e.g., a (poly)anion) that is attracted to, and opposite that of, the first (poly)electrostatic charge. For example, in some embodiments, the first material can include a polycationic material, and the second material can include a polyanionic material.

However, as described in greater detail below, in some embodiments, other complementary bonding groups can be employed. For example, in some embodiments, the first material can include a hydrogen bond donor, and the second material can include a hydrogen bond acceptor.

Retroreflective articles of the present disclosure can provide a dielectric mirror that while still providing high reflectivity, can also be partially transparent, such that an underlying binder layer can be at least partially visible from a front the retroreflective article, i.e., via the mirror. In some embodiments, the dielectric mirror can have a high reflectivity, such that the retroreflective article is suitable for various applications, including safety apparel. Prior retroreflective articles comprising dielectric mirrors could not achieve such high reflectivity and were therefore unsuitable for safety apparel. In addition, in some embodiments, at least a portion of the retroreflective article can be colored (e.g., a binder layer), which can be partially visible via the dielectric mirror, such that the resulting retroreflective article can provide high color luminance values, desired chromaticity coordinates, and optimal retroreflection. That is, embodiments of disclosed retroreflective articles can offer advantages because they are colored but still offer high reflectivities. Disclosed retroreflective articles can offer such advantages because of the combination of a colored binder layer with a dielectric mirror that is also sufficiently transparent to allow the color of the binder layer to be visible through the dielectric mirror, while still exhibiting high reflectivity.

Generally, there is a trade-off between the reflectivity of a dielectric mirror and its transparency, such that as the reflectivity of the dielectric mirror increases, its transparency decreases. As a result, as the reflectivity of the dielectric mirror increases, the color luminance of the resulting retroreflective article decreases. The retroreflective articles of the present disclosure provide an advantageous, previously unforeseen balance between reflectivity and color, such that the retroreflective articles of the present disclosure provide high color luminance (e.g., within a given set of chromaticity coordinates), while also providing sufficiently high reflectivity (e.g., as previously only provided by metal-containing mirrors) to meet a wide variety of colored reflective applications. One subset of colored retroreflective articles employs fluorescent colors to enhance conspicuity, especially during dusk and dawn conditions. The convention used to describe fluorescent colors in regulatory standards (e.g. ISO 20471 and ANSI/ISEA 107-2010) is the combination of color luminance (Y) and a set of chromaticity coordinates (x,y).

Disclosed retroreflective articles can also pass various standard brightness tests, such as EN471 and ANSI 107 for example. Disclosed retroreflective articles can also have good color chroma. "Good color chroma" can refer to the color coating having less dark or black tones which can be caused by the color of a vapor coated metal reflective layer (vapor coated metal reflective layers such as Al or Ag generally appear as a gray color). Disclosed retroreflective articles can also have less dichroism, or angle-of-observation-dependent difference in color (for example less difference from a vertical angle or less difference when squinting). Said another way, retroreflective articles of the present disclosure can have a more uniform appearance (e.g., color) that is less sensitive to viewing angle.

Definitions

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

As used herein the terms "thermoplastic", "non-thermoplastic", and "thermoset", refer to properties of materials. Thermoplastic materials are materials which melt and/or flow upon the application of heat, resolidify upon cooling and again melt and/or flow upon the application of heat. The thermoplastic material undergoes only a physical change upon heating and cooling, no appreciable chemical change occurs. Non-thermoplastic materials are materials that do not flow upon the application of heat up to a temperature where the material begins to degrade. Thermoset materials, are curable materials that irreversibly cure, such as becoming crosslinked, when heated or cured. Once cured, the thermoset material will not appreciably melt or flow upon application of heat.

The terms "room temperature" and "ambient temperature" are used interchangeably to mean a temperature in the range of 20° C. to 25° C.

The term "transparent" is generally used to refer to a body or substrate that transmits at least 75% of electromagnetic radiation at a selected wavelength or within a selected range of wavelengths in the visible light spectrum (e.g., from about 400 nm to about 700 nm; "Vis"); in some embodiments, at least about 80% of a selected wavelength (or range) in the Vis spectrum, in some embodiments, at least about 85%; in some embodiments, at least about 90%; and in some embodiments, at least about 95%. In some embodiments, "partially transparent" can be used to refer to the dielectric mirrors of the present disclosure to represent that the dielectric mirrors can range from less than transparent to transparent.

The phrase "index of refraction," also referred to as "refractive index," "index," or "RI", refers to a refractive index of a material in the plane of the material with respect to light at 633 nm and normal or near normal (i.e. 8 degrees) incidence, unless otherwise indicated.

The phrases "high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

The term "polyelectrolyte" means a polymer with multiple ionic groups capable of electrostatic interaction. "Strong polyelectrolytes" possess permanent charges across a wide range of pH (e.g., polymers containing quaternary ammonium groups or sulfonic acid groups). "Weak polyelectrolytes" possess a pH-dependent level of charge (e.g. polymers containing primary, secondary, or tertiary amines, or carboxylic acids);

Unless specified otherwise, a "band" of electromagnetic radiation wavelengths refers to any wavelength range or increment of at least 10 nm of electromagnetic radiation between 290 nm and 1100 nm. A band may also be greater than 10 nm such as 25 nm, 50 nm, or 100 nm. As used herein, visible light refers to the band of wavelengths from 400 nm to 700 nm; ultraviolet refers to the band of wavelengths from 290 to 400 nm; UV-blue refers to the band of wavelengths from 350 to 490 nm; and near-infrared (near-IR) refers to the band of wavelengths from 700 to 1400 nm; all ranges being inclusive.

The term "thickness" is used to characterize the various layers of retroreflective articles of the present disclosure (e.g., in terms of relative sizing) and is generally used to refer to the dimension of a layer that extends in a direction generally normal to a major plane or surface of the retroreflective article. Such a thickness is shown in the figures schematically as the height in the side cross-sectional views.

The term "bilayer" (or "bi-layer") generally refers to a thin film comprising a layer of a first material and a layer of a second material. As described herein, in some embodiments, a bilayer refers to the combination of a first layer of a first material (e.g., a polycation) having a first bonding group and a second layer of a second material (e.g., a polyanion) having a second bonding group that is complementary to the first bonding group. A first layer can comprise polymers and/or nanoparticles. Similarly, a second layer can comprise polymers and/or nanoparticles. As further described herein, in some embodiments bilayers are conveniently prepared using a layer-by-layer (LbL) self-assembly process.

The term "stack" generally refers to a thickness of material comprising one or more bilayers.

The term "adhesive" as used herein refers to polymeric compositions useful to adhere together two adherends. Examples of adhesives are pressure sensitive adhesives, heat activated adhesives and laminating adhesives.

Pressure sensitive adhesive compositions are well known to those of ordinary skill in the art to possess properties including the following: (1) aggressive and permanent tack at room temperature, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Heat activated adhesives are non-tacky at room temperature but become tacky and capable of bonding to a substrate at elevated temperatures. These adhesives usually have a $T_g$ or melting point ($T_m$) above room temperature. When the temperature is elevated above the $T_g$ or $T_m$, the storage modulus usually decreases and the adhesive become tacky. $T_g$ or $T_m$ can be measured by Differential Scanning Colorimetry (DSC).

Laminating adhesives (also sometimes referred to as contact adhesives) are adhesives designed to form bonds to two substrates immediately after dispensing. Once the adhesive has been dispensed, there is a limited time, sometimes referred to as "open time" in which the adhesive can form a bond to two substrates. Once the open time has elapsed, the laminating adhesive is no longer capable of forming adhesive bonds. Examples of laminating adhesives are hot melt adhesives, solutions or dispersions of polymeric materials or materials curable to form polymeric materials in a liquid medium, and curable adhesives. The laminating adhesive is coated onto a substrate, a second substrate is contacted to the adhesive surface and the formed three layer construction is cooled, dried, and/or cured to form a laminate. Examples of laminating adhesives include the glue sticks used in hot glue guns (which are hot melt types of adhesives that form bonds upon cooling), casein glues, sometimes called "white glue", (which are water-borne dispersions that form bonds upon drying), and cyanoacrylate adhesives (which cure to form bonds upon exposure to air).

Figure 2:
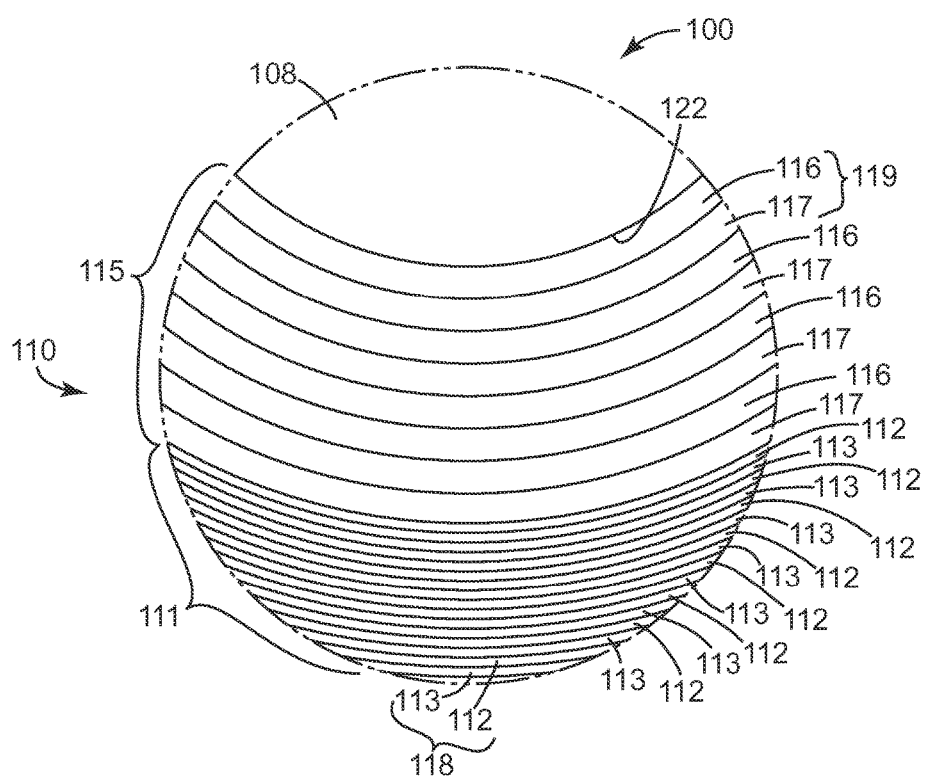
FIG. 2 is a close-up view of the exposed lens retroreflective article of FIG. 1, taken of the portion enclosed in the circle labeled "2" in FIG. 1.

FIGS. 1 and 2 illustrate an exposed lens retroreflective article 100 according to one embodiment of the present disclosure. As shown in FIG. 1, the article 100 includes a layer 105 of transparent microspheres 108 partially embedded in a binder layer 114 (e.g., a polymeric binder layer 114), such that the microspheres are partially exposed and define a front of the retroreflective article 100. The retroreflective article further includes a reflective layer 110 disposed between the binder layer 114 and the microspheres 108, the reflective layer 110 comprising a dielectric mirror comprising a polyelectrolyte. The microspheres 108 and the reflective layer 110 return a substantial quantity of incident light towards the light source. Light that strikes the retroreflective article's front, or front surface, 120 passes through the microspheres 108 and is reflected by the reflective layer 110 to again reenter the microspheres 108, where the light's direction is then altered to return toward the light source. The reflective layer 110 can generally be very thin relative to the binder layer 114. As shown, the retroreflective article 100 can further include at least one of a substrate (e.g., a fabric) and an adhesive 130 coupled to a back (or rear) surface of the binder layer 114 to facilitate coupling the retroreflective article 100 to other substrates or materials.

Additional details regarding various constructions of retroreflective articles, and the various layers thereof, can be found in U.S. Application No. 61/990,989, filed May 9, 2014, which is incorporated herein by reference in its entirety.

Dielectric mirrors can also be referred to as dichroic mirrors, Bragg reflectors, 1-D photonic crystals, or visible light reflectors (VLRs, i.e., when tuned to partially transmit and partially reflect light in the visible spectrum (400-700 nm)), which are each generally understood to those of skill in the art to at least partially reflect light within a desired band of wavelengths by employing alternating high and low refractive index layers. Dielectric mirrors of the present disclosure are at least partially reflective and at least partially transparent, such that underlying layers (e.g., the binder layer 114) can be visible via the dielectric mirror. The term dielectric is used to refer to non-metallic and non-electrically conducting materials.

Dielectric mirrors are generally multi-layer constructions. As shown, the reflective layer 110 is in the form of a dielectric mirror comprising a plurality of layers deposited, e.g., by layer-by-layer self-assembly. The dielectric mirror can include alternating stacks of optical thin films with different refractive indexes (RIs)—e.g., a "high" RI and a "low" RI. The interfaces between stacks with different RIs produce phased reflections, selectively reinforcing certain wavelengths (constructive interference) and cancelling other wavelengths (destructive interference). By selecting certain variables such as stack thickness, refractive indices, and number of the stacks, as explained in more detail below, the band(s) of reflected and/or transmitted wavelengths can be tuned and made as wide or as narrow as desired.

The reflective layer 110, and particularly, the dielectric mirror, is illustrated in FIG. 1 as having two layers for simplicity to represent a low refractive index (RI) stack 115 and a high refractive index (RI) stack 111. Each stack can be characterized by way of example only as a high or low RI layer comprising a plurality of polymer-inorganic oxide bilayers.

The detailed construction of the reflective layer 110 is shown in greater detail in the close-up view of FIG. 2. For example, with reference to FIG. 2, the low RI stack 115 may comprise low RI bilayers 119 of first layers (or first monolayers) 116 that comprise a polymeric polycation, such as polydiallyldimethylammonium chloride (PDAC), and second layers (or second monolayers) 117 that comprise low RI inorganic oxide nanoparticles, such as $SiO_2$ (e.g., at a pH greater than 2, as described in greater detail below), as a polyanion. That is, the first layers 116 can be formed of a first material having a first bonding group (i.e., a polycation), and the second layers 117 can be formed of a second material having a second complementary bonding group (i.e., a polyanion).

By way of example only, the illustrative low RI stack 115 comprises 4 alternating bilayers. In some embodiments, other numbers of alternating bilayers are possible, such as 5 or 6 bilayers, or other numbers, as specified below.

As further shown in FIG. 2, the high RI stack 111 may comprise high RI bilayers 118 of first layers (or first monolayers) 112 that comprise a polymeric polycation, such as polydiallyldimethylammonium chloride (PDAC), and second layers (or second monolayers) 113 that comprise high RI inorganic oxide nanoparticles, such as $TiO_2$ (i.e., at a pH greater than 6, as described in greater detail below), as a polyanion. That is, the first layers 112 are formed of a first material having a first bonding group (i.e., a polycation), and the second layers 112 are formed of a second material having a second complementary bonding group (i.e., a polyanion).

By way of example only, the illustrative high RI stack 111 comprises 8 alternating bilayers. In some embodiments, other numbers of alternating bilayers are possible, such as 9 or 10 bilayers, or other numbers, as specified below.

As shown schematically in FIG. 2, in some embodiments, the first and second layers 112 and 113 (and the resulting bilayers 118) of the high RI stack 111 can be thinner, relative to the first and second layers 116 and 117 (and the resulting bilayers 119) of the low RI stack 115. In addition, as further shown, in some embodiments, the high RI stack 111 can have an overall thickness that is less than that of the low RI stack 115, even though the high RI stack 111 may have more bilayers, e.g., due to nanoparticle size, processing conditions, interactions between layers, desired optical thickness, etc.

A plurality of layers deposited by layer-by-layer (LbL) self-assembly is disposed upon the embedded, rear surfaces 122 of the microspheres 108 to form the dielectric mirror. Additional details of the LbL process are described below, and an exemplary process for making retroreflective articles of the present disclosure is explained in greater detail with respect to FIGS. 5A-5D.

As mentioned above, other complementary bonding groups can be employed in the bilayers instead of, or in addition to, the electrostatic interactions (i.e., first and second materials comprising a polycation and a polyanion, respectively) described above, and these materials are given merely by way of example and illustration. For example, other complementary binding interactions can include, but are not limited to, hydrogen bonding, Van der Waals interactions, hydrophobic interactions, metal ions/ligands, covalent bonding moieties, and/or substrate-ligand binding. Additional details and specific examples of some of these types of complementary binding interactions can be found in E. Seyrek, G. Decher, "Layer-by-Layer Assembly of Multifunctional Hybrid Materials and Nanoscale Devices," *Polymer Science: A Comprehensive Reference*, 2012, Vol. 7.09, p. 159-185, which is incorporated herein by reference.

By way of example, bilayers 118, 119 include inorganic nanomaterials (or inorganic nanoparticles) and a polymeric material. The polymeric material (a polyelectrolyte) has complementary binding to the inorganic nanomaterial. The materials having the first bonding group and the complementary second bonding group include polyanionic material and polycationic material in some examples and hydrogen bond donor material and hydrogen bond acceptor material in other examples. Polymers, nanoparticles, and small molecules can be referred to as "polyionic" or, specifically, "polyanionic" or "polycationic," if they contain a plurality of negative or positive ionic charged sites, respectively. Examples of polyelectrolytes and inorganic nanoparticles are described in greater detail below.

In some embodiments, a plurality of bilayers can form a low or high refractive index stack. A low refractive index stack is then alternated with a high refractive index stack, until desired, to achieve the desired reflectivity over the desired band of wavelengths. The bilayers and stacks of the dielectric mirror are positioned in planar contact with one another. The phrase "in planar contact" or "planarly contacting" is used to indicate that one layer or layered structure is contacting (and disposed either above or below) another layer or layered structure. Such contact is facial contact, rather than edge contact.

The dielectric mirror can be tuned to reflect selected bands of wavelengths, while transmitting other selected bands of wavelengths. The dielectric mirrors of the present disclosure generally use the principle of thin-film interference to reflect specific wavelengths of electromagnetic (EM) radiation. For example, when light strikes the dielectric mirrors at an angle, some of the light is reflected from the top (or front) surface of a stack, and some of the light is reflected from the bottom (or rear) surface where the stack is in contact with an underlying stack. Because the light reflected from the bottom travels a slightly longer path, some light wavelengths are reinforced by this delay, while others tend to be canceled, producing the observed filtering/reflecting effect.

In some embodiments, the thickness of a bilayer, the number of bilayers per stack, the number of stacks, and the thickness of each stack are selected to achieve the desired optical properties using the minimum total thickness of self-assembled layers and/or the minimum number of layer-by-layer deposition steps. In some embodiments, the thickness of each bilayer can range from about 1 nm to about 100 nm. For example, in some embodiments, the thickness of each bilayer can be at least about 5 nm, in some embodiments, at least about 10 nm, in some embodiments, at least about 15 nm, and in some embodiments, at least about 20 nm. In some embodiments, the thickness of each bilayer can be no greater than about 100 nm, in some embodiments, no greater than about 50 nm, and in some embodiments, no greater than about 20 nm.

In some embodiments, the number of bilayers per stack can range from about 1 to about 25. For example, in some embodiments, the number of bilayers can be at least about 2, 3, 4, 5, 6, 7, 8, 9, and at least about 10. In some embodiments, the number of bilayers can be no greater than about 25, 20, 19, 18, 17, and no greater than about 15.

In some embodiments, as mentioned above, stacks that form the dielectric mirrors of the present disclosure comprise bilayers, and the bilayers have a polyelectrolyte as one constituent material, and nanoparticles as another constituent material. As described in more detail below, in some embodiments, bilayers are prepared via layer-by-layer (LbL) deposition methods, such as spray, dip, or spin LbL deposition.

In some embodiments, the polyelectrolyte is a polycationic polymer. Suitable polycationic polymers can include, but are not limited to, polydiallyldimethylammonium chloride (PDAC), linear and branched poly(ethyleneimine) (PEI), poly(allylamine hydrochloride) (PAH), polyvinylamine, chitosan, polyaniline, polyamidoamine, and poly(vinylbenzyltriamethylamine). In some embodiments, the polyelectrolyte is a polyanionic polymer. Suitable polyanionic polymers include, but are not limited to, sulfonated polystyrene (PSS), poly(vinyl sulfate), poly(vinyl sulfonate), poly(acrylic acid), poly(methacrylic acid), dextran sulfate, heparin, hyaluronic acid, carrageenan, carboxymethylcellulose (CMC), alginate, sulfonated tetrafluoroethylene based fluoropolymers such as Nafion®, poly(vinylphosphoric acid), poly(vinylphosphonic acid), and sodium hexametaphosphate.

In some embodiments, the nanoparticles can be one or more of doped and undoped oxides, nitrides or sulfides of metals. For example, such metals include, but are not limited to, silicon, titanium, cerium, zinc, iron, tin, aluminum, zirconium, tungsten, vanadium, niobium or combinations thereof. For example, in some embodiments, the nanoparticles comprise titania ($TiO_2$), silica ($SiO_2$), aluminum oxide ($Al_2O_3$), or the like. In some embodiments, the nanoparticles comprise mixed metal oxides—e.g., the nanoparticles comprise titania and silica, or titania and alumina.

In some embodiments, the nanoparticles comprise a plurality of electrostatic charges. The RIs of adjacent stacks can be made different by selecting different nanoparticles for each stack (i.e., the bilayers for the low RI stack 111 can include one type of nanoparticle, and the bilayers for the high RI stack 115 can include a second type of nanoparticle that is different from the first). In general, the larger the difference in the RIs of the nanoparticles in each stack, the larger the difference in the RIs of the stacks. Processing conditions can also influence the RIs of the stacks.

As mentioned above, it is possible to use hydrogen bonding as the mechanism of LbL coating. In this case, the polymeric material is a hydrogen bond donating polymer (e.g. poly(acrylic acid), poly(methacrylic acid), polyvinyl alcohol) or a hydrogen bond accepting polymer (e.g. polyethyleneoxide, polyvinylpyrrolidone). A hydrogen bond is a relatively weak secondary interaction between a hydrogen atom bound to a more electronegative atom and another atom that is also generally more electronegative than hydrogen and has one or more lone electron pairs, enabling it to act as a base.

Hydrogen bond donors are moieties that contain at least one hydrogen atom that may participate in hydrogen bond formation, and a more electronegative atom bound to the hydrogen atom. Examples of these moieties include, preferably, O—H and N—H, and less preferably, P—H, S—H. The moiety C—H may also, less preferably, be a hydrogen bond donor, when the carbon atom is bound to another atom through a triple bond, when the carbon atom is bound through a double bond to O, or when the carbon atom is bound to at least two atoms selected from O, F, Cl and Br. Hydrogen bond acceptors are moieties that contain an atom more electronegative than hydrogen that also has a lone pair of electrons. Examples of these atoms include preferably N, O and F, and less preferably Cl, Br, I, S and P. Examples of hydrogen bond acceptor moieties include C=O, O—H, N—H, C—F, P=O and C≡N.

Useful LbL material utilizing hydrogen bonding include polymers containing hydrogen bond donors and/or hydrogen bond acceptors, for example polycarboxylic acids such polyacrylic acid and polymethacrylic acid; polynucleotides such as poly(adenylic acid), poly(uridylic acid), poly(cytidylic acid), poly(uridylic acid) and poly(inosinic acid); polymers of vinyl nucleic acids such as poly(vinyladenine); polyamino acids such as polyglutamic acid and poly(ε-N- carbobenzoxy-L-lysine); polyalcohols such as poly(vinyl alcohol); polyethers such as poly(ethylene oxide), poly(1,2-dimethoxyethylene), poly(vinylmethyl ether), and poly(vinylbenzo-18-crown-6); polyketones and polyaldehydes such as poly vinyl butyral and poly(N-vinyl-2-pyrrolidone); polyacrylamides such as polyacrylamide, polymethacrylamide and poly(N-isopropylacrylamide); polyamines such as poly(4-amine)styrene; polyesters such poly(cyclohexane-1,4-dimethylene terephthalate) and polyhydroxy methyl acrylate; polyphosphazenes such as poly(bis(methylamino)phosphazene) and poly(bis(methoxyethoxyethoxy)phosphazene); polysaccharides such as carboxymethyl cellulose; and copolymers thereof.

In some embodiments, the dielectric mirrors of the present disclosure can include porous polymer-containing stacks. In some such embodiments, the porous stacks comprise air within the pores, and are readily adaptable to different stresses (e.g., temperature) as the polymer and air imparts ductility into the thin film. In some embodiments, the presence of a certain amount of porosity within the films making up a dielectric mirror can provide more surface area, e.g., to provide strong adhesion between the dielectric mirror and the microspheres 108 (or an intermediate layer located therebetween). For example, in some embodiments, at least some of the stacks making up the dielectric mirror can have a porosity of at least 1%, at least 5%, at least 15%, at least 20%, at least 25%, at least 30%, at least 40%, and in some embodiments, at least 50% (represented as volume percents, vol %).

Dielectric mirrors can be designed to reflect specific wavelengths of incident EM energy. For example, a mirror can be built to specifically reflect a band of wavelengths $(\lambda_1-\lambda_2)$, including a peak reflectance at $\lambda_3$, which is within the range of $(\lambda_1-\lambda_2)$, and may or may not be at the center of $(\lambda_1-\lambda_2)$. In some embodiments, $\lambda_3$ can be a wavelength in the Vis spectrum, from 400 nm to 700 nm. For example, in some embodiments, $\lambda_3$ can be about 550 nm (e.g., at or near the peak sensitivity within the photopic range).

As described above, the reflective layer may comprise alternating first and second stacks. The first stack can have a high RI equal to $n_H$ (or $n_1$) and the second stacks can have a low RI equal to $n_L$ (or $n_2$), wherein $n_H$ is significantly higher (e.g., higher by a value equal to or more than 0.3, 0.4, 0.5, 0.6, 0.7, 0.8, etc.) than $n_L$.

That is, in some embodiments, $n_H$ and $n_L$ can differ by at least 0.3, in some embodiments by at least 0.4, in some embodiments, by at least by 0.5, in some embodiments, by at least 0.6, in some embodiments by at least 0.7, and in some embodiments, at least 0.8. In some embodiments, $n_H$ and $n_L$ can differ by no greater than 1.4, in some embodiments, by no greater than 1.2, and in some embodiments, no greater than 1.0.

RIs $n_H$ and $n_L$ can be made different, by selecting, e.g., different polymers and/or nanoparticles for the first and second materials. In general, the larger the difference in the RIs of the polymers and/or nanoparticles in each stack, the larger is the difference in the RIs of the stacks. Processing conditions can also influence the RIs of the stacks.

Optical thickness is defined as:

$$t=nd \quad (1)$$

where n is the refractive index and d is the actual physical thickness of the stack. In some embodiments, the high RI stacks and the low RI stacks have optical thicknesses equal to each other. In some embodiments, they can each have an optical thickness equal to $\lambda_1/4$. In some embodiments, the corresponding physical thickness can be given by $\lambda_1/(4*n)$, wherein n is the respective refractive index at $\lambda_1$. Such stacks can be referred to as having quarter wavelength optical thicknesses (QWOTs). In some embodiments, the optical thicknesses of the high RI stacks and the low RI stacks are not the same, especially for designs that provide less angular dependence. In some embodiments, the physical thicknesses of the high RI stacks and the low RI stacks are not the same.

In some embodiments, the physical thickness of the high RI stack 111 can be at least 20 nm, at least 40 nm, or at least 60 nm. In some embodiments, the physical thickness of the high RI stack 111 can be no greater than 200 nm, no greater than 150 nm, or no greater than 100 nm. In some embodiments, the high RI stack 111 can be 70 nm.

In some embodiments, the physical thickness of the low RI stack 115 can be at least 30 nm, at least 60 nm, or at least 90 nm. In some embodiments, the physical thickness of the low RI stack 115 can be no greater than 250 nm, no greater than 200 nm, or no greater than 150 nm. In some embodiments, the low RI stack 115 can be 110 nm.

In some embodiments the dielectric mirror can have a plurality of stacks (i.e., the high RI stacks ("A") and the low RI stacks ("B")) arranged in a repetitive sequence such as ABABA or BABA . . . . In some embodiments (e.g., when the retroreflective article includes a protective layer, as described below with respect to FIGS. 3, 4 and 5A-5D, located in planar contact with the microspheres 108), the dielectric mirror 110 can include an odd number of stacks. For example, in some arrangements, the dielectric mirror 110 can include 3, 5, 7, 9, or 11 stacks, or more than 11 stacks. In some embodiments (e.g., when the retroreflective article does not include a protective layer, as shown in FIGS. 1 and 2), the dielectric mirror 110 can include an even number of stacks. For example, in some embodiments, the dielectric mirror can include 2, 4, 6, 8 10, or 12, or more than 12 stacks.

In some embodiments, the dielectric mirror can include at least 2, 3, 4, 5, 6, 7, 8, 9, 10, 11, 12, 13, 14, 15, 16, 17, 18, 19, or at least 20 stacks. In some embodiments, better reflection is obtained with a relatively larger number of stacks (e.g., greater than 7, or greater than 10 stacks). However, there is generally an inverse relationship between reflection exhibited by the dielectric mirror and the overall color exhibited by the retroreflective article (e.g., reported as color luminance). Thus, the retroreflective articles of the present disclosure provide a balance between reflectivity and color, such that the reflectivity of the dielectric mirror is sufficiently high, without being so high as to significantly diminish or impact the overall exhibited color. For retroreflective articles used in high-visibility safety garments in which fluorescent colors are used to increase dusk and dawn conspicuity, there are specific color requirements for both luminance and chromaticity provided by regulatory standards (e.g. ANSI/ISEA 107-2010). For example, according to such standards, a fluorescent yellow-green article must provide suitable retroreflectivity while maintaining a minimum color luminance of 70, while a fluorescent red-orange article must have a minimum color luminance of 40.

In some embodiments, the number of stacks is less than a specified amount, such as less than 25, less than 20, less than 15, or less than 10 stacks. In some embodiments, the number of stacks is optimized to provide for a desired level of reflection and/or optimized with respect to the number of processing steps and cost or complexity of production.

The refractive indices of the various stacks can vary depending on the desired optics of the dielectric mirror 110. For example, the RI of one or more stacks can be equal to or greater than 1.1, 1.2, 1.3, 1.4, 1.5, 1.6, 1.7, 1.8, 1.9, 2.0, 2.1, 2.2, 2.3, or 2.4. In some embodiments the RI of one or more stacks is less than or equal to 2.5, 2.4, 2.3, 2.2, 2.1, 2.0, 1.9, 1.8, 1.7, 1.6, 1.5, 1.4, 1.3, or 1.2. In some embodiments, the "high" RI (i.e., for the high RI stack 115) is greater than or equal to 1.5, 1.6, 1.7, 1.8, 1.9, 2.0, 2.1, 2.2, 2.3, or 2.4. In some embodiments, the "low" RI (i.e., for the low RI stack 111) is less than or equal to 2.0, 1.9, 1.8, 1.7, 1.6, 1.5, 1.4, 1.3, or 1.2. In some embodiments, the value of the "high" RI and the value of the "low" RI differ by at least 0.3, or at least 0.4, or at least 0.5, or at least 0.6, or at least 0.7, or at least 0.8. In some embodiments, a greater difference or contrast in RI between the high RI stack and the low RI stack can be advantageous. In some embodiments, the "high" RI is between 1.5 and 2.5, and the "low" RI is between 1.2 and 2.0. It will be appreciated, however, that the "high" RI is always greater than the "low" RI.

The plurality of layers making up the dielectric mirror and deposited by layer-by-layer self-assembly comprises at least two layers applied by what is commonly referred to as a "layer-by-layer self-assembly process." The resulting dielectric mirror can be described as a self-assembled dielectric mirror. This process can be used to assemble thin films or coatings of oppositely charged polyelectrolytes electrostatically, but other functionalities such as hydrogen bonding, Van der Waals interactions, hydrophobic interactions, metal ions/ligands, covalent bonding moieties, and/or substrate-ligand binding can also be the driving force for film assembly.

This deposition process can include exposing a substrate (i.e., the rear (exposed) surfaces 122 of the microspheres 108, which are supported by and partially embedded in a carrier web, as described in greater detail below with respect to FIGS. 5A-5D) having an ionic surface charge, to a series of liquid solutions, or baths. This can be accomplished, for example, by immersion of the substrate into liquid baths (also referred to as dip coating), spraying, spin coating, roll coating, inkjet printing, and the like. Exposure to the first polyion (e.g. bath) liquid solution, which has an ionic charge opposite that of the substrate, results in ionically charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. In order for mass transfer and adsorption to occur, this exposure time can be on the order of seconds to minutes.

The substrate is then removed from the first polyion (e.g. bath) liquid solution, and is then exposed to a series of water rinse baths to remove any physically entangled or loosely bound polyelectrolyte. Following these rinse (e.g. bath) liquid solutions, the substrate is then exposed to a second polyion (e.g. bath) liquid solution, which has a charge opposite that of the first polyion (e.g. bath) liquid solution. Once again, adsorption occurs, since the surface charge of the substrate is opposite that of the second (e.g. bath) liquid solution. Continued exposure to the second polyion (e.g. bath) liquid solution then results in a reversal of the surface charge of the substrate. A subsequent rinsing can be performed to complete the cycle. This sequence of steps is said to build up one layer pair, also referred to herein as a "bilayer" of deposition and can be repeated as desired to add further layer pairs to the substrate, where each bilayer includes a first monolayer having a positive or negative surface charge (i.e., outer surface charge) and an adjacent second monolayer having the opposite surface charge of the first monolayer (i.e., negative or positive, respectively).

Some examples of suitable processes include those described in Krogman et al., U.S. Pat. No. 8,234,998 and Nogueira et al., U.S. Pat. No. 8,313,798. Layer-by layer dip coating can be conducted using a StratoSequence VI (nanoStrata Inc., Tallahassee, Fla.) dip coating robot. Layer-by-layer spray coating can be conducted using a SPALAS™ coating system (Nanotrons Corp., Woburn, Mass.).

The LbL process described above makes us of charge-charge (i.e., ionic or electrostatic) interactions. However, LbL processes can also be employed to build stacks by making use of hydrogen bonding, or other complementary interactions to assemble successive layers into a stack. This can involve the use of solvents to ionize molecules or support hydrogen donation and acceptance in the deposition solutions. In some embodiments, alcohols, glycols, and other organic solvents are used. In some embodiments, water is used. In some embodiments, combinations of solvents are used.

As mentioned above, other complementary binding interactions can include, but are not limited to, hydrogen bonding, Van der Waals interactions, hydrophobic interactions, metal ions/ligands, covalent bonding moieties, and/or substrate-ligand binding.

In some embodiments, LbL deposition is carried out by spray application of at least two deposition solutions. In one deposition solution is contained a polyelectrolyte such as a polymer material dissolved in a solvent. In the other deposition solution is contained a nanoparticles dissolved or dispersed in a solvent. Multiple spray applications are made in alternating fashion in order to build up the layers of the stack. Adjacent layers contain opposite charges (or another binding pair such as complementary hydrogen bonding groups) such that the layers bind to each other to create a stable stack. Each pair of layers containing complementary binding materials is referred to herein as a "bilayer," and each stack can include one or more bilayers.

In some embodiments, films formed using spray LbL are made to be porous.

Depending on the choice of deposition parameters, the porosity can range from about 0%, with essentially no pores, to nearly 75%, where a substantial volume fraction of the stack is open space. The RI of a stack decreases with increased porosity, making it possible to tune the RIs of each film for desirable properties, such as a maximum difference in refractive indices, by adjusting the porosities of the stacks, as well as by choice of materials (e.g. metal oxide nanoparticles) in the stacks. Thus, using LbL to form stacks for dielectric mirrors is especially useful, particularly when a wide difference between the RIs of adjacent films is desirable. The larger the RI difference between the films, the broader the range of wavelengths that are reflected.

In some embodiments, dielectric mirrors of the present disclosure are not prepared from co-extruded polymers. In some embodiments, the dielectric mirrors are not prepared from a plurality of neutral (i.e., uncharged, or non-polyelectrolyte) polymers.

In some embodiments, stacks are prepared using the methods described herein that have narrow bandpass characteristics. That is, the stacks allow a narrow band of desired frequencies to pass, while still maintaining high reflectivity. In this context, a "narrow band" is meant a band of wavelengths centered around $\lambda_1$ and having a width at half maximum of, for example, less than 50 nm, or less than 100 nm, or less than 200 nm, or less than 300 nm, or less than 400 nm, or less than 500 nm.

In some embodiments, layer-by-layer self-assembly can be utilized to deposit alternating polymer-polymer layers and alternating inorganic nanoparticle-inorganic nanoparticle layers. However, in some embodiments, the plurality of layers deposited by layer-by-layer self-assembly comprises a plurality of alternating polymer-inorganic nanoparticle layers.

Strong polyelectrolytes can be used as the polymer of the polymer-inorganic nanoparticle layers. For example, PDAC can provide a strongly positively-charged cationic layer.

The molecular weight of the polyelectrolyte can vary, ranging from about 1,000 g/mole to about 1,000,000 g/mole. In some embodiments, the weight-average molecular weight (Mw) of the positively charged cationic layer (e.g. PDAC) ranges from 100,000 g/mole to 200,000 g/mole.

The inorganic nanoparticles of the alternating polymer-inorganic nanoparticle layers can have an average primary or agglomerate particle size diameter of at least 1, 2, 3, 4, or 5 nanometers, and, in some embodiments, can be no greater than 80, 90 or 100 nanometers. The average particle size of the nanoparticles of the dried self-assembled layers can be measured using transmission electron microscopy or scanning electron microscopy, for example. The average particle size of the nanoparticles in the nanoparticle suspension can be measured using dynamic light scattering. "Agglomerate" refers to a weak association between primary particles which may be held together by charge or polarity and can be broken down into smaller entities. "Primary particle size" refers to the mean diameter of a single (non-aggregate, non-agglomerate) particle. As used herein "aggregate" with respect to particles refers to strongly bonded or fused particles where the resulting external surface area may be significantly smaller than the sum of calculated surface areas of the individual components. The forces holding an aggregate together are strong forces, for example covalent bonds, or those resulting from sintering or complex physical entanglement. Although agglomerated nanoparticles can be broken down into smaller entities such as discrete primary particles such as by application of a surface treatment; the application of a surface treatment to an aggregate simply results in a surface treated aggregate. In some embodiments, a majority of the nanoparticles (i.e. at least 50%) are present as discrete unagglomerated nanoparticles in the coating suspensions. For example, in some embodiments, at least 70%, 80% or 90% of the nanoparticles can be present as discrete unagglomerated nanoparticles.

In some embodiments the nanoparticles (e.g. silica) have a relatively small average particle size. For example, in some embodiments, the average primary or agglomerate particle size can be less than 50 nm, less than 30 nm, less than 25 nm, less than 20 nm, or less than 15 nm. In some embodiments, the nanoparticles can have an average particle size of at least 2 nm, at least 3 nm, at least 5 nm, or at least 10 nm.

The concentration of inorganic nanoparticles can be at least 30 wt.-% of the dried low RI stack 115, high RI stack 111, or the totality of self-assembled polymer-nanoparticle layers. In some embodiments, the concentration of inorganic nanoparticles can be no greater than about 80 wt-%, in some embodiments, no greater than about 85 wt-%, in some embodiments no greater than about 90 wt-%, and in some embodiments, no greater than about 95 wt-%. The concentration of inorganic nanoparticles can be determined by methods known in the art, such as thermogravimetric analysis. In some embodiments, the dried low RI stack 115, high RI stack 111, or the totality of self-assembled polymer-nanoparticle layers can include at least 50 wt-%, at least 55 wt-%, at least 60 wt-%, at least 65 wt-%, or at least 70 wt.-%, or at least 80 wt.-%, or at least 90 wt.-% of inorganic nanoparticles to provide better mechanical durability and scratch resistance in addition to the reflectivity properties previously described.

In some embodiments, the nanoparticles of the low RI stack 115 have a refractive index of no greater than 1.50, such as silica. Nanoparticles for use in the low RI bilayer or stack can include silica (although other oxides can be used, such as zirconia, alumina, ceria, tin (stannic) oxide), or composite nanoparticles such as core-shell nanoparticles. A core-shell nanoparticle can include a core of an oxide (e.g., iron oxide) or metal (e.g., gold or silver) of one type and a shell of silica deposited on the core. Herein, the phrase "silica nanoparticles" refers to nanoparticles that include only silica as well as core-shell nanoparticles with a surface that includes silica. It is appreciated however, that unmodified silica nanoparticles commonly comprise hydroxyl or silanol functional groups on the nanoparticle surface, particularly when the nanoparticles are provided in the form of an aqueous dispersion. Aqueous dispersions of silica nanoparticles can also be ammonium or sodium stabilized. Silica has an isoelectric point at about pH 2 and can thus be used as a polyanion in the layer-by-layer self-assembly process at pH values greater than 2, more preferably at pH values greater than or equal to 3.

Some inorganic silica sols in aqueous media are available commercially. Silica sols in water or water-alcohol solutions are available commercially under such trade names as LUDOX (manufactured by W.R. Grace and Company, Columbia, Md.), NYACOL (available from Nyacol Co., Ashland, Mass.) or NALCO (manufactured by Nalco Chemical Co., Oak Brook, Ill.). Some useful silica sols are NALCO 1115, 2326, 1050, 2327, and 2329 available as silica sols with mean particle sizes of 4 nanometers (nm) to 77 nm. Another useful silica sol is NALCO 1034a available as a silica sol with a mean particle size of 20 nanometers. A useful silica sol is NALCO 2326 available as a silica sol with a mean particle size of 5 nanometers. Additional examples of suitable colloidal silicas are described in U.S. Pat. No. 5,126,394 (Revis et al.).

In some embodiments, the nanoparticles of the layer-by-layer self-assembled high RI bilayer or stack have a refractive index of greater than 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60 such as titania, zirconia, alumina, tin oxides, antimony oxides, ceria, zinc oxide, lanthanum oxide, tantalum oxide, mixed metal oxides thereof, and mixtures thereof. Zirconia sols are available under trade name NYACOL® ZRO2 (available from Nyacol Co., Ashland, Mass.) and Nissan Chemical America Corporation under the trade name NanoUse ZR™. Zirconia nanoparticles can also be prepared such as described in U.S. Patent Publication No. 2006/0148950 (Davidson et al.) and U.S. Pat. No. 6,376,590 (Kolb et al).

In some embodiments, the layer-by-layer self-assembled bilayer, or stack comprises titania. Various forms of titania can be utilized including anatase, brookite, rutile and amorphous forms. Anatase titania nanoparticles (5-15 nm diameter) are commercially available from U.S. Research Nanomaterials, Houston, Tex. as an aqueous suspension at 15 wt %. Titania sols are also available dispersed in strong acid or base condition from Ishihara Sangyo Kaisha Ltd (Osaka, Japan). Titania sols are also available under product code X500 from Titan PE (Shanghai, China). Titania has an isoelectric point at about pH 4-6 and thus can be used as a polyanion in layer-by-layer self-assembly at pH greater than 6, preferably pH greater than 7, more preferably pH greater than 8, or the polycation in layer-by-layer self-assembly at pH less than 4, more preferably pH less than 3.

Various other organic and inorganic nanoparticle particles can be used for the low refractive index or high refractive index bilayers or stacks of the self-assembled layers, as known in the art, some of which are described in Kurt et al., U.S. Pat. No. 8,446,666.

The selection of the inorganic materials used in creating the multilayer inorganic layer will depend upon the reflection bandwidth of interest. For example, the plurality of layers deposited by layer-by-layer self-assembly can be a quarter (¼) wave stack (QWOT) wherein control of the spectrum is achieved by controlling the thickness of the high and low refractive index stacks by altering the number of deposited bilayers and/or altering the conditions during the layer-by-layer self-assembly process such as the pH and ionic strength of the liquid (e.g. bath) solutions. It is appreciated that the plurality of layers deposited by layer-by-layer self-assembly generally does not utilize birefringence for creating a refractive index difference between the low refractive and high refractive index stacks.

The plurality of layers deposited by layer-by-layer self-assembly can be a non-quarter wave stack such as described in Kurt et al, U.S. Pat. No. 8,446,666.

Microspheres

The transparent microspheres are substantially spherical in shape in order to provide the most uniform and efficient retroreflection. The microspheres are transparent so as to minimize absorption of light so that a large percentage of the incident light is retroreflected. The microspheres often are substantially colorless but may be tinted or colored in some other fashion.

The microspheres may be made from glass, a non-vitreous ceramic composition, or a synthetic resin. Glass and ceramic microspheres are particularly suitable because they tend to be harder and more durable than microspheres made from synthetic resins. Examples of microspheres that may be used are described in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

The microspheres can have an average diameter in the range of about 30 to 200 micrometers. Microspheres smaller than this range tend to provide lower levels of retroreflection, and microspheres larger than this range may impart an undesirably rough texture to the retroreflective article or may undesirably reduce its flexibility. The microspheres can have a refractive index of about 1.7 to about 2.0, which can be useful in exposed lens retroreflective products.

Binder Layer

In some embodiments, the binder layer can contain a colorant (i.e., can be a "colored binder layer"), and contains a flexible polymeric binder material that is colored in some fashion. The binder layer also may contain such optional additives such as UV stabilizers, antioxidants, UV absorbers, property modifiers, performance enhancers, or combinations thereof. Generally, the binder layer contains from about 70 weight percent up to about 99 weight percent of a polymeric binder material with the remainder being optional additives in effective amounts.

The polymeric binder material of the binder layer may be a polymer including, but not limited to, an elastomer. In this disclosure, an elastomer is defined as a polymer having an ability to be stretched to at least twice its original length and to retract to approximately its original length when released, (definition taken from "Hawley's Condensed Chemical Dictionary", R. J. Lewis Sr. Ed., 12th Ed., Van Nostrand Reinhold Co., New York, N.Y. (1993)). In some embodiments, the polymeric binder material can include a cross-linked or virtually cross-linked elastomer. A cross-linked elastomer means that the polymeric chains of the elastomer are chemically cross-linked to form a three dimensional network which is stabilized against molecular flow. A virtually cross-linked elastomer means that the polymeric chain mobility of the elastomer is greatly reduced by chain entanglement and/or by hydrogen bonding, resulting in an increase in the cohesive or internal strength of the polymer. Examples of such polymer cross-linking include carbon-carbon bond formation such as: free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of such virtual cross-linking include amide hydrogen bonding as is found in polyamides or crystalline and amorphous region interactions as is found in block copolymers of styrene and acrylonitrile.

Illustrative examples of the polymers that may be employed as the binder material in the binder layer include: polyolefins; polyesters; polyurethanes; polyepoxides; natural and synthetic rubbers; and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of useful binder layer materials are disclosed in U.S. Pat. Nos. 5,200,262 and 5,283,101. In the '262 patent, the binder layer comprises one or more flexible polymers, such as crosslinked urethane-based polymers (for example, isocyanate cured polyesters or one of two component polyurethanes) and one or more isocyanate-functional silane coupling agents. In the '101 patent, the binder layer comprises an electron-beam cured polymer selected from the group consisting of chlorosulfonated polyethylenes, ethylene copolymers comprising at least about 70 weight percent polyethylene, and poly(ethylene-co-propylene-co diene) polymers.

Examples of commercially-available polymers that may be used in the binder layer include the following: VITEL 3550 and VITEL 5833 polyesters available from Bostik, Wauwatosa, Wis.; RHOPLEX HA-8 and NW-1845 acrylic resins available from Dow Chemical; CYDROTHANE a polyurethane available from Cytec Industries, West Patterson, N.J.; ESTANE 5703 and 5715 available from Lubrizol Corp., Cleveland, Ohio; and NIPOL 1000, available from Zeon Chemicals, Inc., Louisville, Ky.

The binder layer can have a thickness of about 50 to 250 micrometers (2 to 10 mils), with thicknesses of about 75 to 200 micrometers (3 to 8 mils) often being particularly suitable. It is to be understood that a binder layer having a thickness outside these ranges may be used; however, if the binder layer is too thin, it may not provide sufficient support to the microspheres, allowing them to become dislodged.

The binder layer can be colored by incorporating a dye, a pigment or a combination of dye and pigment therein.

Examples of suitable dyes and pigments include those included in the following table:

| Color Index Name | Color Index Number | Company Order Number | Company |
|---|---|---|---|
| Yellow 16 | 12,700 | SUDAN YELLOW 146 | BASF, Florham Park, NJ |
| Yellow 56 | 11,021 | SUDAN YELLOW 150 | BASF, Florham Park, NJ |
| Red 1 | 12,150 | SUDAN RED 290 | BASF, Florham Park, NJ |
| Blue 35 | 61,554 | SUDAN BLUE 35 | BASF, Florham Park, NJ |
| Pigment Yellow 83 | 21,108 | 275-0570 | Sun Chemical, Parsippany, NJ |
| Pigment Yellow 17 | 21,105 | 275-0023 | Sun Chemical, Parsippany, NJ |

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used to color the binder layer, include: DAY-GLO FIRE ORANGE T-14, ROCKET RED GT, BLAZE ORANGE GT, and SATURN YELLOW T-17, from Day-Glo Color Corp., Cleveland, Ohio; FLARE 911 from Cleveland Pigment & Color Co., Akron, Ohio; LUMOGEN F RED 300, F YELLOW 083, and YELLOW S0790 (PIGMENT YELLOW 101, C.I. No. 48052), BASF Corporation, Florham Park, N.J.

A pigment can be any material that is capable of changing the color of reflected or transmitted light as the result of wavelength-selective adsorption. Any colored pigment can be utilized in retroreflective articles as disclosed herein. In some embodiments, the pigment can be a nanopigment. A nanopigment is a pigment that generally has an average particle size in the nanometer range. In some embodiments, a nanopigment can have an average particle size from about 1 nm to about 1000 nm. Nanopigments can be useful because of the interaction of light with them; light will diffract from nanopigments because of their size, which can contribute to high reflectivities. In some embodiments, a nanopigment can have an average particle size from about 50 nm to about 500 nm. An exemplary nanopigment that can be utilized includes CABOJET 300, which is commercially available from Cabot Corporation (Boston, Mass.).

In some embodiments, the binder layer can include pigments of varying sizes. For example, in some embodiments, the binder layer can include pigments having average particle sizes from about 1 nm to about 1000 nm (1 micrometer); from 50 nm to about 500 nm; from about 1 micrometer to about 40 micrometers (e.g., 15 micrometers); or a combination thereof.

The binder layer can include a desirable amount of pigment to provide a desired color or depth of color of the binder layer or retroreflective article. The amount of pigment in the binder layer can depend at least in part on the particular pigment(s) utilized, the desired color or shade of color, the other components in the binder layer, and combinations thereof. In some embodiments, the binder layer can have 0.1 to 70 percent pigment, by weight of solids in the binder layer; from 1 to 40 percent pigment, by weight of solids in the binder layer; or from 5 to 35 percent pigment, by weight of solids in the binder layer.

Properties

The retroreflective articles of the present disclosure can exhibit high reflectivity, such that the retroreflective articles can be suitable, for example, for use in safety apparel. In some embodiments, the retroreflective articles of the present disclosure can exhibit a coefficient of retroreflection $R_A$ of at least 250 candela per lux per square meter (cd/lux/m$^2$), in some embodiments, at least 300 cd/lux/m$^2$, in some embodiments, at least 350 cd/lux/m$^2$, in some embodiments, at least 400 cd/lux/m$^2$, and in some embodiments, at least 450 cd/lux/m$^2$, e.g., when tested pursuant to EN471 or ANSI 107, (e.g., when measured at 0.2° observation angle/5° entrance angle, i.e., from a vertical or normal direction with respect to a major plane of the retroreflective article). In some embodiments, the retroreflective article can exhibit an $R_A$ of at least 330 cd/lux/m$^2$.

At least partly due to the partial transparency of the reflective layer, retroreflective articles of the present disclosure can also exhibit high color luminance (Y), e.g., when the binder layer is colored and is visible through the reflective layer. In some embodiments, for example for fluorescent yellow-green colored retroreflective articles, the retroreflective article can exhibit a Y of at least 70 in some embodiments, at least 80, and in some embodiments at least 90. In some embodiments, for example for fluorescent red-orange colored retroreflective articles, the retroreflective article can exhibit a Y of at least 40, in some embodiments, at least 45, and in some embodiments at least 50.

Chromaticity for fluorescent color applications can also be defined by specified coordinate ranges. For example, the chromaticity for fluorescent yellow-green should fall with the space defined by the boundaries (0.387, 0.610), (0.356, 0.494), (0.398, 0.452), (0.460, 0.540). For fluorescent red-yellow, the chromaticity should fall with the space defined by the boundaries (0.610, 0.390), (0.535, 0.375), (0.570, 0.340), (0.655, 0.344).

Besides the properties of retroreflectivity and high daylight visibility (e.g., desired chromaticity coordinates, color luminance (Y)), the retroreflective articles of this disclosure can have a variety of other desirable properties. Among these properties are wash durability, flame retardency, and color-fastness of the colored binder layer.

By wash durability, it is meant that the retroreflective articles of this disclosure are capable of being laundered without losing the desired properties of the article, namely retroreflectivity and high daylight visibility. Wash durability of retroreflective articles can be described in a variety of different ways. An example of good washing performance was described in US Patent Publication No. 2011/0292508 (Huang et al.), as retaining at least about 100 cd/lux/m$^2$ at 5/0.2 angle after being washed 15 times (i.e., after 15 washes), e.g., when subjected to ISO 6330A laundering method. In some embodiments, the retroreflective article can exhibit a coefficient of retroreflection, $R_A$, of at least about 200 cd/lux/m$^2$ at 5/0.2 angle after being washed 15 times. In yet other embodiments, the retroreflective article can exhibit an $R_A$ of at least about 300 cd/lux/m$^2$ at 5/0.2 angle after being washed 15 times. In other embodiments, the retroreflective article can exhibit an $R_A$ of at least about 100 cd/lux/m$^2$ at 5/0.2 angle after being washed 50 times. In still other embodiments, the retroreflective article can exhibit an $R_A$ of at least about 100 cd/lux/m$^2$ at 5/0.2 angle after being washed 100 times.

By flame retardant it is meant that the retroreflective articles of this disclosure are resistant to heat and flames. The articles of this disclosure can be exposed to heat or flames without losing the desired properties of the article, namely retroreflectivity and high daylight visibility. A number of flame retardency regulatory standards are known and used in the industry, such as for example, the NFPA 1971 Standard on Protective Ensembles for Structural Fire Fighting and Proximity Fire Fighting. Testing involves high temperature soaking and vertical flame tests. The main performance criteria are the absence of materials ignition, melting, dripping, and layer separation. Flame retardency is a feature that is particularly desirable in applications where heat and flames are likely to be encountered by the articles, such as on articles of clothing to be worn by firefighters.

By the binder layer being color-fast, it is meant that the color of the binder layer does not fade with time or upon exposure to the environment or upon being washed. Colorfastness criteria are described, for example, in high-visibility safety garment regulatory standards such as ISO 20471 and ANSI/ISEA 107-2010, and include conditions such as ironing, dry cleaning, dry and wet rub washing, and solar exposure.

Discontinous or Segmented Retroreflective Articles

In some embodiments, retroreflective articles of the present disclosure can include at least a portion that is discontinuous. By discontinuous it is meant that there is a region in the segment that is devoid of, for example, microspheres, reflective layers, the binder layer, and any intervening layers. These discontinuities can be beneficial for a variety of reasons. In some embodiments, the discontinuities can form a pattern or design. The pattern or design can be in the form of indicia, logos, etc. In other embodiments, the discontinuities can be arranged either randomly or in a non-continuous pattern. Besides the visual effect of the discontinuities, the discontinuities can provide enhanced breathability for the retroreflective article. By this it is meant that gases, and or moisture can pass through the retroreflective article more easily. An effect of the enhanced breathability is to be more comfortable for a person wearing such an article. This is particularly desirable for construction workers, firefighters, emergency workers, and people exercising. Examples of various designs of retroreflective articles having discontinuous segments can be seen in FIGS. 2-5 of U.S. Pat. No. 8,256,025, which is incorporated herein by reference.

In addition, discontinuous does not necessarily include wholly or completely discrete and separated retroreflective portions. Rather, as shown in FIGS. 2-5 of U.S. Pat. No. 8,256,025, in some embodiments, a discontinuous retroreflective article merely includes retroreflective portions and non-retroreflective portions, and the retroreflective portions need not be completely or wholly distinct. In some embodiments, there can be continuity between or amongst the retroreflective portions.

Retroreflective articles with discontinuous segments can be prepared in a variety of different ways. A particularly suitable way involves partially removing portions of the retroreflective article (e.g., through its thickness) while it is coupled to a carrier web (i.e., as a transfer articles), which is sometimes referred to as "weeding." The discontinuous portions of the retroreflective article remain in proper registration relative to one another due to the carrier web and will therefore be transferred to a substrate in the desired arrangement or pattern. Weeding can be effected by cutting, scraping, and other suitable mechanical means. Alternatively, portions of the retroreflective article can be removed by hole punching, or other suitable means.

Adhesive Layer

The substrate 130 of FIG. 1 is illustrated by way of example only as an adhesive, or adhesive layer.

Examples of suitable adhesive layers include pressure sensitive adhesives, heat activated adhesives, and laminating adhesives. The adhesive layer may be applied to the binder layer or backing layer by coating or by lamination of a formed adhesive layer to the binder layer or backing layer.

A wide variety of pressure sensitive adhesives are suitable including tackified natural rubbers, synthetic rubbers, tackified styrene block copolymers, polyvinyl ethers, poly (meth) acrylates, polyurethanes, polyureas, poly-alpha-olefins, and silicones. The pressure sensitive adhesive may be covered with a release liner to protect the adhesive prior to adhesion to a substrate.

Heat activated adhesives are very similar to pressure sensitive adhesives but require the application of heat to become tacky. One advantage of heat activated adhesives is that, because they are not tacky at room temperature, they generally do not require a release liner to protect the adhesive layer prior to adhesion to a substrate.

If a laminating adhesive is used, the adhesive layer can be immediately bonded to a substrate to form the adhesive substrate bond.

A wide variety of articles of clothing are suitable for attachment of retroreflective appliqués, or transfer articles. Examples of such articles of clothing include, for example, vests such as the safety vests frequently worn by road construction workers, but also include a wide range of other clothing types. Examples include, but are not limited to, shirts, sweaters, jackets, coats, pants, coveralls, shorts, socks, shoes, gloves, belts, hats, suits, one-piece body garments, and the like.

Additional exemplary embodiments of retroreflective articles of the present disclosure will now be described with respect to FIGS. 3-5C. FIGS. 3-5C illustrate retroreflective articles of the present disclosure, wherein like numerals represent like elements. The retroreflective articles of FIGS. 3-5C shares many of the same elements, features, and functions as the retroreflective article 100 described above with respect to FIGS. 1-2. Reference is made to the description above accompanying FIGS. 1-2 for a more complete description of the features and elements (and alternatives to such features and elements) of the embodiments illustrated in FIGS. 3-5C. Any of the features described above with respect to FIGS. 1-2 can be applied to the embodiments of FIGS. 3-5C, and vice versa.

Figure 3:
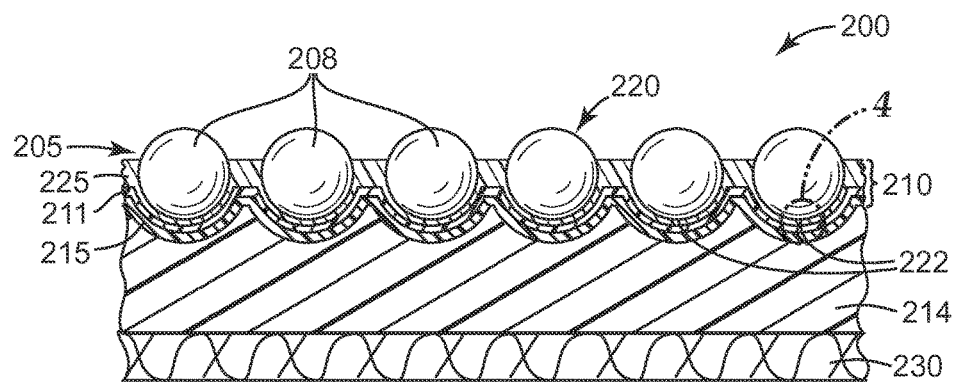
FIG. 3 is a side cross-sectional view of an exposed lens retroreflective article according to another embodiment of the present disclosure.
Figure 4:
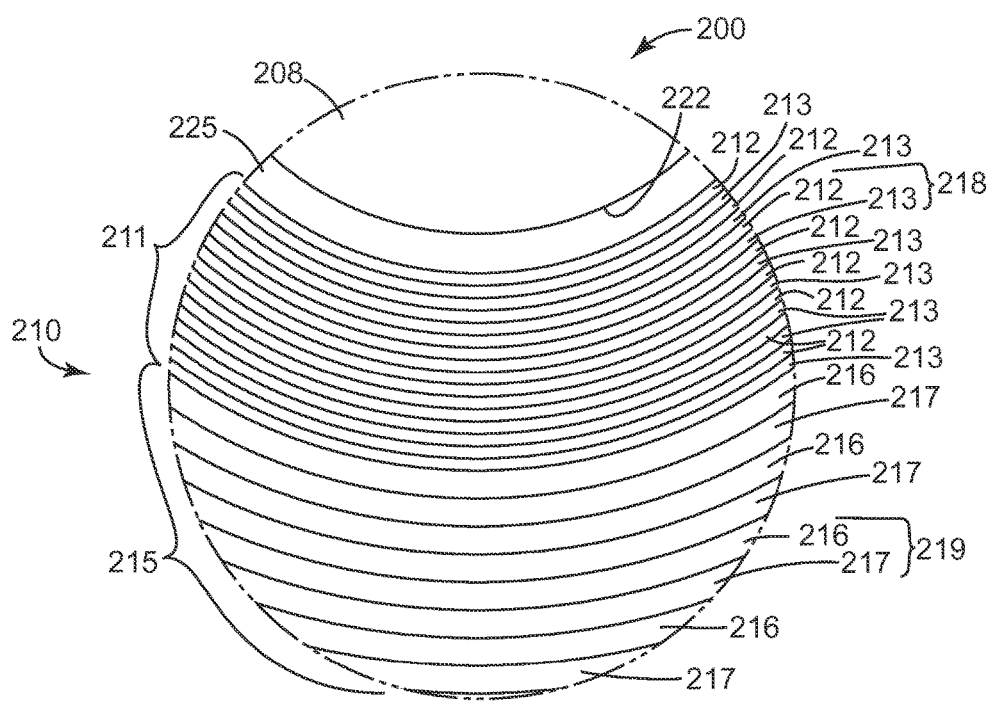
FIG. 4 is a close-up view of the exposed lens retroreflective article of FIG. 3, taken of the portion enclosed in the circle labeled "4" in FIG. 3.

FIGS. 3 and 4 illustrate a retroreflective article 200 according to another embodiment of the present disclosure. As shown in FIG. 3, the retroreflective article 200 includes a layer 205 of transparent microspheres 208 partially embedded in a binder layer 214 (e.g., a polymeric binder layer 214), and a reflective layer 210 disposed between the binder layer 214 and the microspheres 208, the reflective layer 210 comprising a dielectric mirror comprising a polyelectrolyte. The retroreflective article 200 further includes a protective layer 225, which is described in greater detail below.

The microspheres 208 and the reflective layer 210 return a substantial quantity of incident light towards the light source. Light that strikes the retroreflective article's front, or front surface, 220 passes through the microspheres 208 and is reflected by the reflective layer 210 to again reenter the microspheres 208, where the light's direction is then altered to return toward the light source. The reflective layer 210 can generally be very thin relative to the binder layer 214.

As shown, the retroreflective article 200 can further include a substrate (e.g., a fabric) 235 (or an adhesive similar to the adhesive 130 of FIGS. 1 and 2) coupled to a back surface of the binder layer 214 to facilitate coupling the retroreflective article 200 to other substrates or materials.

The reflective layer 210, and particularly, the dielectric mirror, is illustrated in FIG. 3 as having two self-assembled layers for simplicity to represent a high refractive index (RI) stack 211 and a low refractive index (RI) stack 215.

As described below, in some embodiments, the protective layer 225 can function as a portion of the reflective layer 210, e.g., as a low RI layer of the dielectric mirror. As a result, in the retroreflective article 200, the first stack of the multi-layer LbL ("self-assembled") layers is the high RI stack 211, the second stack of the LbL layers is the low RI stack 215, and the reflective layer 210 is shown in FIGS. 3 and 4 as including three layers, i.e., the protective layer 225, the high RI stack 211, and the low RI stack 215.

The detailed construction of the reflective layer 210 is shown in greater detail in the close-up view of FIG. 4. By way of example only, the reflective layer 210 includes a high RI stack 211 comprised of 8 alternating bilayers, and a low RI stack 215 comprised of 4 alternating bilayers. In some embodiments, other numbers of alternating bilayers are possible, such as 8 or 9 bilayers for the high RI stack 211, or 5 or 6 bilayers for the low RI stack 215, or other number as specified above.

As shown in FIG. 4, the high RI stack 111 may comprise high RI bilayers 218 of first layers (or first monolayers) 212 that comprise a polymeric polycation, such as polydiallyldimethylammonium chloride (PDAC), and second layers (or second monolayers) 213 that comprise high RI inorganic oxide nanoparticles, such as $TiO_2$ (i.e., at a pH greater than 6, as described in greater detail below), as a polyanion. That is, the first layers 212 are formed of a first material having a first bonding group (i.e., a polycation), and the second layers 212 are formed of a second material having a second complementary bonding group (i.e., a polyanion).

As further shown in FIG. 4, the low RI stack 215 may comprise low RI bilayers 219 of first layers (or first monolayers) 216 that comprise a polymeric polycation, such as polydiallyldimethylammonium chloride (PDAC), and second layers (or second monolayers) 217 that comprise low RI inorganic oxide nanoparticles, such as $SiO_2$ (e.g., at a pH greater than 2, as described in greater detail below), as a polyanion. That is, the first layers 216 are formed of a first material having a first bonding group (i.e., a polycation), and the second layers 217 are formed of a second material having a second complementary bonding group (i.e., a polyanion).

As shown schematically in FIG. 4, in some embodiments, the first and second layers 212 and 213 (and the resulting bilayers) of the high RI stack 211 can be thinner, relative to the first and second layers 216 and 217 (and the resulting bilayers) of the low RI stack 215. In addition, as further shown, in some embodiments, the high RI stack 211 can have an overall thickness that is less than that of the low RI stack 215 (even though the high RI stack 211 may have more bilayers), e.g., due to nanoparticle size, processing conditions, interactions between layers, desired optical thickness, etc.

As mentioned above, other complementary bonding groups can be employed in the bilayers instead of, or in addition to, the electrostatic interactions (i.e., first and second materials comprising a polycation and a polyanion, respectively) described above, and these materials are given merely by way of example and illustration.

Protective Layer

The protective layer 225 is generally a transparent polymeric layer that can provide protection to the reflective layer 210 and can enhance the durability of the retroreflective article 200, especially the wash durability of the retroreflective article 200. Since it is desirable that the retroreflective articles of the present disclosure be washable, wash durability is particularly important. By wash durability it is meant the number of times that the article can be laundered while maintaining its retroreflective performance. Wash durability is further described and defined in the 'Properties' section above and in the Examples.

In addition, in some embodiments, the protective layer 225 can function not only as a protective layer, but also as a portion of the reflective layer 210. For example, in some embodiments, the protective layer 225 can function as a low RI index layer component of the multi-layer dielectric reflective layer 210. In such embodiments, the first stack of the dielectric mirror could be a high RI stack. Additional details of embodiments in which the protective layer 225 serves as a portion of the reflective layer 210 are discussed in greater detail below. One concern in adding polymeric layers between the transparent microspheres and the reflecting layer is that this added layer can interfere with the retroreflective performance of the article since both incident and reflective rays of light have to pass through this layer. By making the protective layer part of the multi-layer dielectric mirror construction, this concern can be reduced or eliminated.

As shown in FIG. 3, the protective layer 225 can cover the region between the transparent microspheres 208 and the reflective layer 210 (i.e., around a rear surface 222 of the microspheres 208). In such embodiments, the reflective layer 210 is located functionally behind the microspheres 208 and the protective layer 225. In addition, as shown, the protective layer 225 can also cover the regions that are between adjacent microspheres 208 in the layer 205 of microspheres 208, such that the protective layer 225 is disposed in at least one of:
  (i) between the reflective layer 210 and the layer 205 of microspheres 208 (i.e., between the rear surface 222 (i.e., the embedded portion) of the microspheres 208 and the reflective layer 210); and
  (ii) in a lateral space (e.g., within the layer 205) between laterally spaced apart microspheres 208 (i.e., between the reflective layer 210 and ambience, in embodiments in which the layer 205 of microspheres 208 includes lateral spacing between adjacent microspheres 208).

In some embodiments, the protective layer 225 can be disposed both (i) between the reflective layer 210 and the microspheres 208 and (ii) in a lateral space between laterally spaced apart microspheres 208. In such embodiments, as shown, the protective layer 225 can have a thickness that is greater in the lateral space between laterally spaced apart microspheres 208 than it is between the reflective layer 210 and the layer 205 of microspheres 208. In some embodiments, the protective layer 225 can be at least 2 times (2×) thicker between laterally spaced apart microspheres 208 than it is between the reflective layer 210 and the microspheres 205; in some embodiments, at least 5×; and in some embodiments, at least 10×.

As a result, in some embodiments, the protective layer 225 can be described as being non-uniform in thickness, because it is thinner at the rear surface 222 of the microspheres 208 than it is between the microspheres 208. Furthermore, in some embodiments, the greater thickness between microspheres 208 can be a result of the protective material collecting or pooling between the microspheres 208 causing the material to neck between adjacent microspheres 208.

As mentioned above, the protective layer 225 can be a thin, transparent polymeric layer. Generally any layer thickness is suitable as long as the layer does not adversely affect the retroreflective properties of the article. For example, the layer thickness can be in the range of 0.01 micrometers to 10 micrometers (e.g., from about 300 nm to about 600 nm).

In some embodiments, the protective layer 225 can have an average thickness that is less than the average diameter of the microspheres 208. In some embodiments, the protective layer 225 can have an average thickness that is at least about 0.0005 times the average diameter of the microspheres 208, in some embodiments, at least about 0.005 times, and in some embodiments, at least about 0.05 times. In some embodiments, the protective layer 225 can have an average thickness that is no greater than about 0.3 times the average diameter of the microspheres 208, in some embodiments, no greater than about 0.2 times, and in some embodiments, no greater than 0.1 times.

In addition, in embodiments in which the protective layer 225 is disposed between (i.e., laterally between) microspheres 208, the protective layer 224 is exposed to the ambient atmosphere and conditions in the final retroreflective article 200.

In addition, as mentioned above, the protective layer 225 can have a refractive index in the range of low RI materials suitable for use in multi-layer dielectric reflective layer 210, and can therefore function as part of the multi-layer dielectric mirror of the reflective layer 210. In other words, the protective layer 225 can function as a first layer of the multi-layer dielectric mirror. This feature can be significant because the protective layer 225 is thus not only an extra polymeric layer that the incident and reflected rays of light have to pass through, but rather the protective layer 225 participates in the reflecting of rays of incident light since it has a refractive index different from that of the microspheres 208 and that of the first stack (e.g., the high RI stack 211) of the dielectric mirror 210. The protective layer 225 may be a single layer or it may comprise a plurality of layers (e.g., sublayers). Additionally, the protective layer 225 may contain one or more additives. Among suitable additives are dyes, pigments, UV stabilizers, antioxidants, UV absorbers, property modifiers, performance enhancers, or combinations thereof. Such additives can provide UV stability to enhance the color-fastness of the colored article, as well as improving the wash durability and flame retardency.

In some embodiments, the protective layer 225 is a colored layer and contains dyes, pigments, or a combination thereof. Making this additional layer a colored layer can make the article more highly colored and thereby make it more visible in daylight. Suitable dyes and pigments include those described above as suitable for use in the colored binder layer. The amount of colored additives, if used, is at a sufficiently low level so as to not interfere with the retroreflectivity of the reflective layer 210. In embodiments in which a colorant is employed in the protective layer 225, the protective layer 225 preferably includes pigments, and preferably nanopigments, such as those with an average particle size that is less than the average thickness of the protective layer 225.

A wide range of polymeric materials are suitable for preparing the protective layer 225. The polymeric material may be a urethane material, urea material, ester material, epoxy material, carbonate material, (meth)acrylate material, olefinic material, vinyl chloride material, amide material, alkyd material, or combination thereof.

In some embodiments, the protective layer 225 can be formed of a polyurethane layer that comprises a dried layer prepared from an aqueous polyurethane dispersion. Additional details of such materials can be found in U.S. Application No. 61/990,958, filed May 9, 2014, which is incorporated herein by reference in its entirety.

Figure 5A:
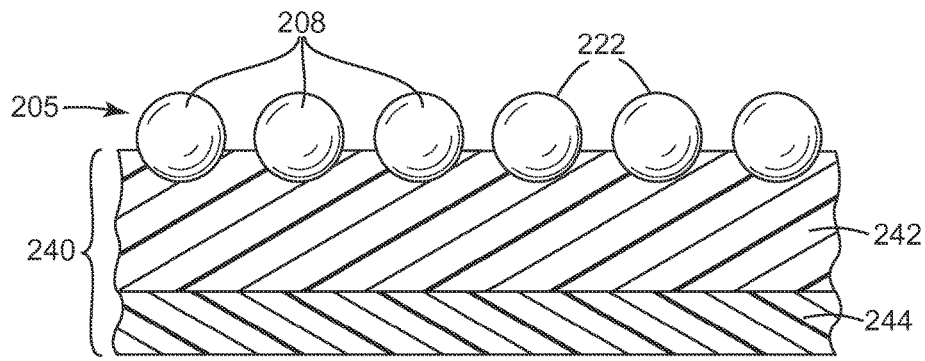
FIGS. 5A-5D illustrate a method of making the exposed lens retroreflective article of FIGS. 3 and 4.
Figure 5B:
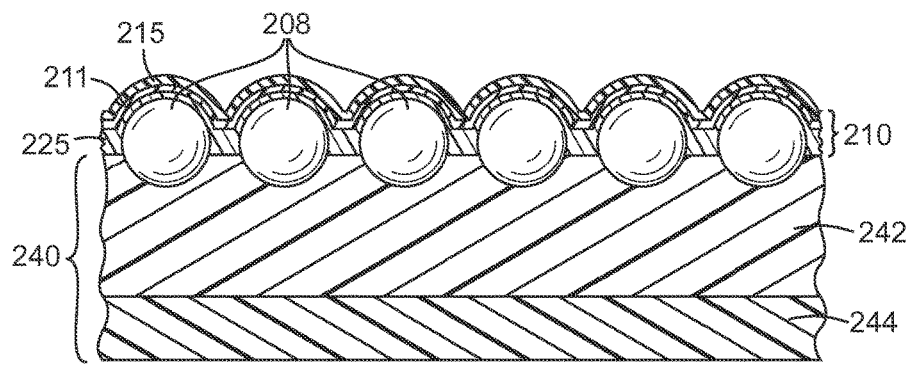
Figure 5C:
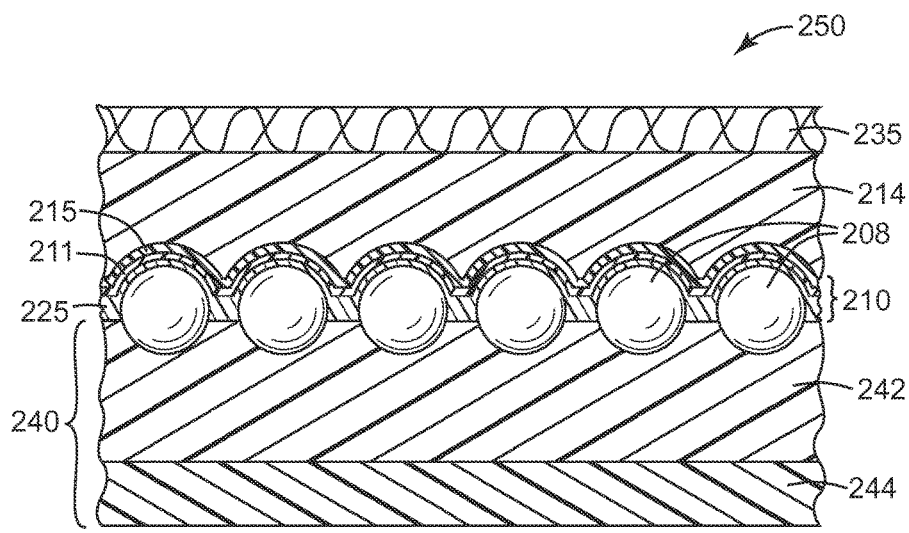

FIGS. 5A-5C illustrate a method of making a retroreflective article of the present disclosure. Specifically, by way of example only, FIGS. 5A-5C illustrate a method of making the retroreflective article 200 of FIGS. 3 and 4.

The retroreflective article 200 can be made by first forming a transfer article 250 shown in FIG. 5C. As shown in FIG. 5A, a first step in making the transfer article 250 can include partially embedding the microspheres 208 on a carrier web 240 (or "carrier" or "carrier layer") to form a layer (e.g., monolayer) 205 of microspheres. The layer 205 can be formed by cascading a plurality of microspheres 208 onto the carrier web 240 in a desired temporary arrangement. For example, microspheres 208 can be packed as closely as possible (e.g., in a close-packed hexagonal arrangement) on the carrier web 240 to achieve very good retroreflective brightness and may be so arranged by any convenient application process, such as printing, screening, cascading, or hot rolling. Upon cooling, the carrier web 240, or a portion thereof, retains the microspheres in a desired arrangement.

The microspheres 208 are partially embedded in the carrier web 240, e.g., to about 20 to 50 percent of the microspheres' diameter. The portions of the microspheres 208 that are not embedded in the carrier web 240 protrude from the carrier web 240 so that they can subsequently receive the protective layer 225, the reflective layer 210, and the binder layer 214 in sequence. That is, the exposed portions of the microspheres 208 in FIG. 5A will form the "rear surfaces" 222 of the microspheres 208 in the final article.

In some embodiments, as shown in FIG. 5A, the carrier web 240 can include a heat softenable polymeric carrier layer 242 and optionally a support sheet 244.

A wide variety of materials and combinations of materials are suitable for the polymeric carrier layer 242. In some embodiments, the polymeric carrier layer 242 can be a thermoplastic polymeric carrier layer, but in other embodiments, the polymeric carrier layer may comprise an elastomeric polymeric carrier layer, and in some embodiments may even be a pressure sensitive adhesive or a heat activated adhesive. In some embodiments, the polymeric carrier layer 242 can include a thermoplastic polymeric carrier layer. In some embodiments, the thermoplastic polymeric carrier layer 242 may be a stand-alone layer; in other embodiments the thermoplastic polymeric carrier layer may comprise a coating of thermoplastic polymeric carrier material on the first major surface of the support sheet 244. The support sheet 244, if employed, may comprise, for example, paper, a polymeric film, or the like. Examples of useful polymeric carrier materials include, but are not limited to, polyvinyl chloride, polysulfones, polyalkylenes such as polyethylene, polypropylene and polybutylene, polyesters, other suitable polymers, or a combination thereof.

Upon cooling, the polymeric carrier layer 242 can retain the microspheres 208 in the desired arrangement. Depending in part on the characteristics of the carrier web 240 and the microspheres 208, it may be desirable to condition the carrier web 240 and/or the microspheres 208 by applying selected release agents or adhesion promoters to achieve desired carrier release properties.

As shown in FIG. 5B, after the microspheres 208 are partially embedded in the temporary carrier web 240, the protective layer 225 (or a protective composition that will form the protective layer 225) can be applied to, or deposited onto, the exposed portions of the microspheres 208. This can be accomplished by, for example, applying a solution of prepolymer components onto the protruding portions of the microspheres. The reflective layer 210 is applied to the protective layer 225 on the side where the microspheres 208 protrude from carrier web 240 (i.e., the rear or back of the microspheres 208 and the protective layer 225). The reflective layer 210 can be applied as described above, e.g., using a LbL self-assembly process. For example, the high RI stack 211 can be applied, followed by the low RI stack 215.

As shown in FIG. 5C, after applying the reflective layer 210, a binder composition (e.g., a solution of binder layer components) can be applied onto the specularly reflective layer 210. As further shown in FIG. 5C, the substrate 235 (e.g., a fabric) can be embedded in the binder layer 214 composition before curing. The substrate 235 can be secured to the binder layer 214 on the side opposite the reflective layer 210. Alternatively, if a fabric is not used as the substrate 235, an adhesive (such as the adhesive 130 of FIG. 1) may be applied to binder layer 214 (or to the binder layer composition before curing).

Figure 5D:
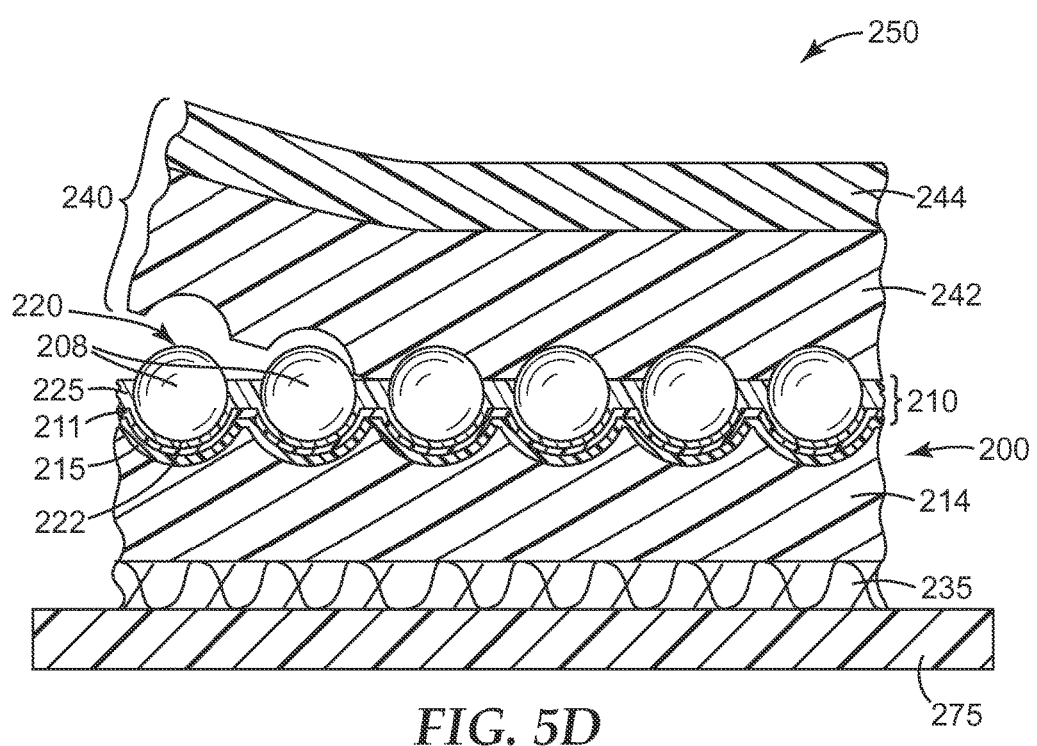

FIG. 5D shows the transfer article 250 being coupled to another substrate, body or material 275 (such as a garment, or a material (e.g., a patch) that will be further coupled to a garment). In some embodiments, the substrate 235 can be applied to the material 275 using mechanical methods, such as sewing. In some embodiments, however, it can be desirable to couple the substrate 235 of the transfer article 250 to the material 275 by an adhesive layer (not shown). The adhesive layer can be, for example, any of the adhesives described above with respect to the adhesive layer 130 of FIG. 1.

As shown in FIG. 5D, the temporary carrier web 240 can be removed (e.g., peeled off) from the remainder of the transfer article 250 to obtain the retroreflective article 200, e.g., coupled to the material 275. As can be seen by comparing FIGS. 5C and 5D, the transfer article 250 has been turned upside down from FIG. 5C to FIG. 5D, such that now the rear surfaces 222 of the microspheres 208 are oriented toward the material 275, and the front 220 of the retroreflective article 200 is exposed and is oriented away from the material 275.

The material 275 bearing the retroreflective article can be located on the outer surface of an article of clothing or garment, enabling the retroreflective article 200 to be displayed when the clothing is worn in its normal orientation on a person. The material 275 may include, for example: a woven or nonwoven fabric such as a cotton fabric; a polymeric layer including nylons, olefins, polyesters, cellulosics, urethanes, vinyls, acrylics, rubbers; leather; other suitable materials; or combinations thereof.

Each embodiment shown in the figures is illustrated as a separate embodiment for clarity in illustrating a variety of features of the retroreflective articles of the present disclosure. However, it should be understood that any combination of elements and features of any of the embodiments illustrated in the figures and described herein can be employed in the retroreflective articles of the present disclosure.

The following embodiments are intended to be illustrative of the present disclosure and not limiting.

EMBODIMENTS

1. An exposed lens retroreflective article comprising:
a binder layer;
a layer of transparent microspheres partially embedded in the binder layer; and
a reflective layer disposed between the binder layer and the microspheres, the reflective layer comprising a dielectric mirror, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group.

2. A transfer article comprising:
a carrier web having a first major surface and a second major surface opposite the first major surface;
a layer of transparent microspheres partially embedded in the first major surface of the carrier web;
a reflective layer disposed over the microspheres and the first major surface of the carrier web, the reflective layer comprising a dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and
a binder layer disposed over the reflective layer.

3. A method of making a retroreflective article, the method comprising:
partially embedding a plurality of transparent microspheres in a carrier web;
applying a dielectric mirror to the exposed portions of the microspheres to form a reflective layer, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and
applying a binder composition to the reflective layer to form a binder layer.

4. The retroreflective article of embodiment 1, the transfer article of embodiment 2, or the method of embodiment 3, wherein the dielectric mirror comprises a polyelectrolyte.

5. The retroreflective article of embodiment 1 or 4, the transfer article of embodiment 2 or 4, or the method of embodiment 3 or 4, wherein one of the first material and the second material includes a polycation and the other of the first material and the second material includes a polyanion.

6. The retroreflective article of any of embodiments 1, 4 and 5, the transfer article of any of embodiments 2, 4 and 5, or the method of any of embodiments 3-5, wherein at least one of the first material and the second material includes a polyelectrolyte.

7. The retroreflective article of any of embodiments 1 and 4-6, the transfer article of any of embodiments 2 and 4-6, or the method of any of any of embodiments 3-6, wherein the first material includes a polyelectrolyte and the second material includes nanoparticles.

8. The retroreflective article of any of embodiments 1 and 4-7, the transfer article of any of embodiments 2 and 4-7, or the method of any of any of embodiments 3-7, wherein each bilayer includes a polyelectrolyte.

9. The retroreflective article of any of embodiments 1 and 4-8, the transfer article of any of embodiments 2 and 4-8, or the method of any of any of embodiments 3-8, wherein each bilayer includes nanoparticles.

10. The retroreflective article of any of embodiments 1 and 4-9, the transfer article of any of embodiments 2 and 4-9, or the method of any of any of embodiments 3-9, wherein one of the first stack and the second stack comprises silica nanoparticles, and wherein the other of the first stack and the second stack comprises titania nanoparticles.

11. The retroreflective article of any of embodiments 1 and 4-10, the transfer article of any of embodiments 2 and 4-10, or the method of any of any of embodiments 3-10, wherein the first stack includes at least one first bilayer comprising a polyelectrolyte, and wherein the second stack includes at least one second bilayer comprising a polyelectrolyte.

12. The retroreflective article, the transfer article or the method of embodiment 11, wherein the at least one first bilayer and the at least one second bilayer each comprise a first monolayer having a positive or negative surface charge and an adjacent second monolayer having the opposite surface charge of the first monolayer.

13. The retroreflective article, the transfer article or the method of embodiment 12, wherein the first monolayer comprises a polymer and the second monolayer comprises nanoparticles.

14. The retroreflective article of any of embodiments 1 and 4-13, the transfer article of any of embodiments 2 and 4-13, or the method of any of any of embodiments 3-13, wherein the first stack is a low refractive index stack comprising low refractive index bilayers and the second stack is a high refractive index stack comprising high refractive index bilayers.

15. The retroreflective article, the transfer article, or the method of embodiment 14, wherein the low refractive index bilayers and the high refractive index bilayers each include a polyelectrolyte and nanoparticles.

16. The retroreflective article of any of embodiments 1 and 4-15, the transfer article of any of embodiments 2 and 4-15, or the method of any of any of embodiments 3-15, wherein the first stack has a first refractive index $n_1$, and the second stack has a second refractive index $n_2$ that is different from the first refractive index $n_1$.

17. The retroreflective article, the transfer article, or the method of embodiment 16, wherein $n_1$ and $n_2$ differ by at least 0.4.

18. The method of any of embodiments 3-17, wherein applying a binder composition includes applying a binder composition comprising a colorant to the reflective layer to form a colored binder layer.

19. The method of any of embodiments 3-18, wherein the dielectric mirror further comprises nanoparticles.

20. The method of any of embodiments 3-19, wherein applying a dielectric mirror includes applying a plurality of layers deposited by layer-by-layer self-assembly.

21. The method of any of embodiments 3-20, further comprising removing the carrier web to form an exposed lens retroreflective article.

22. The method of any of embodiments 3-21, further comprising applying a protective layer composition to the exposed surfaces of the microspheres to form a protective layer, wherein applying a reflective layer to the exposed portions of the microspheres includes applying a reflective layer over the protective layer.

23. The method of embodiment 22, wherein the protective layer is disposed in at least one of: (i) between the reflective layer and the microspheres; and (ii) in a lateral space between laterally spaced apart microspheres.

24. The method of embodiment 22 or 23, wherein the protective layer is disposed both (i) between the reflective layer and the layer of microspheres and (ii) in a lateral space between laterally spaced apart microspheres, wherein the protective layer has a thickness that extends in a direction generally normal to a major plane of the retroreflective article, and wherein the thickness of the protective layer is greater in the lateral space between laterally spaced apart microspheres than between the reflective layer and the layer of microspheres.

25. The method of any of embodiments 22-24, wherein the thickness of the protective layer is at least 2× greater in the lateral space between laterally spaced apart microspheres than between the reflective layer and the layer of microspheres.

26. The method of any of embodiments 22-25, wherein the protective layer composition comprises a polyurethane layer that comprises a dried layer prepared from an aqueous polyurethane dispersion.

27. The method of embodiment 26, wherein the protective layer composition further comprises a colorant.

28. The retroreflective article of any of embodiments 1 and 4-17, the transfer article of any of embodiments 2 and 4-17, or the method of any of any of embodiments 3-27, wherein the binder layer has a color, and wherein the binder layer color is visible from a front of the retroreflective article, via the reflective layer and the microspheres.

29. The retroreflective article of any of embodiments 1, 4-17 and 28, the transfer article of any of embodiments 2, 4-17 and 28, or the method of any of any of embodiments 3-28, wherein the binder layer includes a colorant.

30. The retroreflective article, the transfer article, or the method of embodiment 29, wherein the binder layer is fluorescent.

31. The retroreflective article of any of embodiments 1, 4-17 and 28-30, the transfer article of any of embodiments 2, 4-17 and 28-30, or the method of any of any of embodiments 3-30, wherein the dielectric mirror further comprises nanoparticles.

32. The retroreflective article of any of embodiments 1, 4-17 and 28-31, the transfer article of any of embodiments 2, 4-17 and 28-31, or the method of any of any of embodiments 3-31, wherein the dielectric mirror comprises a plurality of layers deposited by layer-by-layer self-assembly.

33. The retroreflective article of any of embodiments 1, 4-17 and 28-32, the transfer article of any of embodiments 2, 4-17 and 28-32, or the method of any of any of embodiments 3-32, further comprising a protective layer disposed in at least one of: (i) between the reflective layer and the layer of microspheres; and (ii) in a lateral space between laterally spaced apart microspheres.

34. The retroreflective article, the transfer article, or the method of embodiment 33, wherein the protective layer is disposed both (i) between the reflective layer and the microspheres and (ii) in a lateral space between laterally spaced apart microspheres, wherein the protective layer has a thickness that extends in a direction generally normal to a major plane of the retroreflective article, and wherein the thickness of the protective layer is greater in the lateral space between laterally spaced apart microspheres than between the reflective layer and the layer of microspheres.

35. The retroreflective article of any of embodiments 1, 4-17 and 28-32, the transfer article of any of embodiments 2, 4-17 and 28-32, or the method of any of any of embodiments 3-32, wherein the microspheres are laterally spaced apart, and further comprising a protective layer disposed at least between adjacent laterally spaced apart microspheres.

36. The retroreflective article, the transfer article, or the method of embodiment 35, wherein the protective layer is further disposed between the reflective layer and the microspheres.

37. The retroreflective article of any of embodiments 1, 4-17 and 28-32, the transfer article of any of embodiments 2, 4-17 and 28-32, or the method of any of any of embodiments 3-32, further comprising a protective layer disposed at least between the reflective layer and the microspheres.

38. The retroreflective article, the transfer article, or the method of embodiment 33-37, wherein the protective layer forms a portion of the reflective layer.

39. The retroreflective article, the transfer article, or the method of any of embodiments 33-38, wherein the protective layer comprises a polyurethane layer that comprises a dried layer prepared from an aqueous polyurethane dispersion.

40. The retroreflective article, the transfer article, or the method of any of embodiments 33-39, wherein the protective layer comprises a colorant.

41. The retroreflective article, the transfer article, or the method of embodiment 40, wherein the protective layer comprises a pigment.

42. The retroreflective article, the transfer article, or the method of embodiment 41, wherein the pigment has an average size from about 1 nm to about 1000 nm.

43. The retroreflective article of any of embodiments 1, 4-17 and 28-42, wherein the retroreflective article has a coefficient of retroreflection ($R_A$) of at least 100 cd/lux/m$^2$ after 50 washes, when subjected to ISO 6330A laundering method.

44. The retroreflective article of any of embodiments 1, 4-17 and 28-43, wherein the retroreflective article is fluorescent yellow-green colored and exhibits a coefficient of retroreflection ($R_A$) of at least 330 cd/lux/m$^2$ and a luminance (Y) of at least 70.

45. The retroreflective article of any of embodiments 1, 4-17 and 28-43, wherein the retroreflective article is fluorescent red-orange colored and exhibits a coefficient of retroreflection ($R_A$) of at least 330 cd/lux/m$^2$ and a luminance (Y) of at least 40.

46. The retroreflective article of any of embodiments 1, 4-17 and 28-45, the transfer article of any of embodiments 2, 4-17 and 28-42, or the method of any of embodiments 3-42, wherein the reflective layer selectively reflects electromagnetic radiation within a band of wavelengths around a selected wavelength $\lambda_1$.

47. The retroreflective article, the transfer article, or the method of embodiment 46, wherein the selected wavelength $\lambda_1$ is 550 nm.

48. The retroreflective article of any of embodiments 1, 4-17 and 28-47, the transfer article of any of embodiments 2, 4-17, 28-42 and 46-47, or the method of any of embodiments 3-42 and 46-47, wherein the dielectric mirror has a porosity (i.e., a nanoporosity) of at least 15 vol %.

49. The retroreflective article of any of embodiments 1, 4-17 and 28-48, the transfer article of any of embodiments 2, 4-17, 28-42 and 46-48, or the method of any of embodiments 3-42 and 46-48, wherein the dielectric mirror comprises at least one of silica nanoparticles and titania nanoparticles.

50. A transfer article comprising the exposed lens retroreflective article of any of embodiments 1, 4-17 and 28-49, wherein the microspheres are further partially embedded in a carrier web.

51. A garment comprising:
a fabric having a first major surface and a second major surface opposite the first major surface; and
the exposed lens retroreflective article of any of embodiments 1, 4-17 and 28-49;
wherein the binder layer of the retroreflective article is coupled to the first major surface of the garment, such that the microspheres are exposed on the first major surface of the garment.

52. A colored exposed lens retroreflective article comprising:
a colored polymeric binder layer;
a layer of transparent microspheres partially embedded in the binder layer, such that the microspheres are partially exposed and define a front of the retroreflective article; and
a reflective layer disposed between the binder layer and the microspheres, the reflective layer comprising a dielectric mirror comprising a polyelectrolyte, wherein the reflective layer is configured such that the colored binder layer is visible from the front of the retroreflective article;

53. The retroreflective article of embodiment 52, wherein the retroreflective article is fluorescent yellow-green colored and exhibits a coefficient of retroreflection ($R_A$) of at least 330 cd/lux/m$^2$ and a luminance (Y) of at least 70.

54. The retroreflective article of embodiment 52, wherein the retroreflective article is fluorescent red-orange colored and exhibits a coefficient of retroreflection ($R_A$) of at least 330 cd/lux/m$^2$ and a luminance (Y) of at least 40.

55. An exposed lens retroreflective article comprising:
a binder layer;
a layer of transparent microspheres partially embedded in the binder layer; and
a reflective layer disposed between the binder layer and the microspheres, the reflective layer comprising a dielectric mirror comprising a polyelectrolyte.

56. A transfer article comprising:
a carrier web having a first major surface and a second major surface opposite the first major surface;
a layer of transparent microspheres partially embedded in the first major surface of the carrier web;
a reflective layer disposed over the microspheres and the first major surface of the carrier web, the reflective layer comprising a dielectric mirror comprising a polyelectrolyte; and
a binder layer disposed over the reflective layer.

57. A method of making a retroreflective article, the method comprising:
partially embedding a plurality of transparent microspheres in a carrier web;
applying a dielectric mirror to the exposed portions of the microspheres to form a reflective layer, the dielectric mirror comprising a polyelectrolyte; and
applying a binder composition to the reflective layer to form a binder layer.

58. The retroreflective article of embodiment 55, the transfer article of embodiment 56, or the method of embodiment 57, wherein the dielectric mirror comprises alternating stacks of low refractive index bilayers and high refractive index bilayers.

59. The retroreflective article, the transfer article, or the method of embodiment 58, wherein the low refractive index bilayers and the high refractive index bilayers each include a polyelectrolyte and nanoparticles.

60. The retroreflective article of any of embodiments 55 and 58-59, the transfer article of embodiment 56 and 58-59, or the method of any of embodiments 57-59, wherein the dielectric mirror comprises:

a first stack comprising at least one first bilayer, wherein at least one first bilayer comprises a polyelectrolyte, wherein the first stack has a first refractive index $n_1$, and a second stack adjacent the first stack, the second stack comprising at least one second bilayer, wherein at least one second bilayer comprises a polyelectrolyte, wherein the second stack has a second refractive index $n_2$ that is different from the first refractive index $n_1$.

61. The retroreflective article, the transfer article, or the method of embodiment 60, wherein $n_1$ and $n_2$ differ by at least 0.4.

62. The retroreflective article, the transfer article, or the method of embodiment 60 or 61, wherein the at least one first bilayer and the at least one second bilayer each further comprise nanoparticles.

63. The retroreflective article, the transfer article, or the method of any of embodiments 60-62, wherein one of the first stack and the second stack comprises silica nanoparticles, and wherein the other of the first stack and the second stack of the reflective layer comprises titania nanoparticles.

64. The retroreflective article, the transfer article, or the method of any of embodiments 60-63, wherein the at least one first bilayer and the at least one second bilayer each comprise a first monolayer having a positive or negative surface charge and an adjacent second monolayer having the opposite surface charge of the first monolayer.

65. The retroreflective article, the transfer article, or the method of embodiment 64, wherein the first monolayer comprises a polymer and the second monolayer comprises nanoparticles.

66. The method of any of embodiments 57-65, wherein applying a dielectric mirror includes applying alternating stacks of low refractive index bilayers and high refractive index bilayers.

67. The method of embodiment 66, wherein the low refractive index bilayers and the high refractive index bilayers each include a polyelectrolyte and nanoparticles.

68. The method of any of embodiments 57-67, wherein applying a dielectric mirror includes:

applying a first stack comprising at least one first bilayer, wherein at least one first bilayer comprises a polyelectrolyte, wherein the first stack has a first refractive index $n_1$, and applying a second stack adjacent the first stack, the second stack comprising at least one second bilayer, wherein at least one second bilayer comprises a polyelectrolyte, wherein the second stack has a second refractive index $n_2$ that is different from the first refractive index $n_1$.

69. The method of embodiment 68, wherein $n_1$ and $n_2$ differ by at least 0.4.

70. The method of embodiment 68 or 69, wherein the at least one first bilayer and the at least one second bilayer each further comprise nanoparticles.

71. The method of any of embodiments 68-70, wherein one of the first stack and the second stack comprises silica nanoparticles, and wherein the other of the first stack and the second stack of the reflective layer comprises titania nanoparticles.

72. The method of any of embodiments 68-71, wherein applying a first stack and applying a second stack each includes:

applying a first monolayer having a positive or negative surface charge; and applying a second monolayer adjacent the first monolayer, the second monolayer having the opposite surface charge of the first monolayer.

73. The method of embodiment 72, wherein the first monolayer comprises nanoparticles and the second monolayer comprises a polyelectrolyte.

It should be further understood that embodiment 57 can be further modified by any of the limitations of embodiments 18-27, that embodiment 55 can be further modified by any of the limitations of embodiments 43-45 and 50-51, and that any of embodiments 55-57 can each be further modified by any of the limitations of embodiments 28-42 and 46-49.

The following working examples are intended to be illustrative of the present disclosure and not limiting.

EXAMPLES

All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: nm=nanometers; mPa=milliPascals; psi=pounds per square inch; MPa=MegaPascals; min=minutes; mm=millimeters. The terms "weight %", "% by weight", and "wt %" are used interchangeably.

Table of Abbreviations

| Abbreviation or Trade Designation | Description |
| --- | --- |
| Colorant | Commercially available as "GT-17-N SATURN YELLOW PIGMENT" from Day-Glo Color Corp., Cleveland, OH. |
| PE-1 | Polyester resin commercially available as "VITEL 3550 B" from Bostik Company, Wauwatosa, WI. |
| PE-2 | Polyester resin commercially available as "VITEL 5833" from Bostik Company, Wauwatosa, WI. |
| Silane | Commercially available as "SILQUEST A 1310" from Momentive Performance Materials, Strongsville, OH. |
| ISO | Aromatic Polyisocyanate, commercially available as "DESMODUR L75" from Bayer MaterialScience, Pittsburgh, PA. |
| DBTDL | Dibutyl tin dilaurate catalyst |
| MIBK | Methyl isobutyl ketone solvent |
| MEK | Methy ethyl ketone solvent |
| DAA | Diacetone Alcohol solvent |
| FR-1 | Flame Retardant-1, brominated flame retardant, commercially available as "SAYTEX 102E", Albemarle Corp., Baton Rouge, LA. |
| TPU-1 | Thermoplastic Polyurethane, commercially available as "ESTANE 5703" from Lubrizol, Cleveland, OH. |

-continued

| Table of Abbreviations | |
|---|---|
| Abbreviation or Trade Designation | Description |
| Ox-1 | Antimony Trioxide, commercially available from Chemtura Corporation, Middlebury, CT. |
| Ox-2 | Titanium Oxide, commercially-available as "Ti-Pure R-960" from DuPont, Wilmington, DE. |
| PDAC | Poly(diallyl-dimethyl ammonium chloride), a positively charged polymer with molecular weight 100-200K, obtained as a 20 wt % solution in water |
| $SiO_2$ | Silica nanoparticles (20-24 nm diameter, ammonium stabilized), obtained as a 40 wt % aqueous dispersion under the trade designation "Ludox AS-40" |
| $TiO_2$ | Anatase titania nanoparticles obtained as a 10 wt % suspension in water from Sigma-Aldrich Co., St. Louis, Missouri under trade designation "TiMaKs-W10.1" available by special order (product #Q52940, lot# SHBD2327V) |
| TMAOH | Tetramethylammonium hydroxide, obtained as a 25 wt % solution in water from Alfa Aesar, Ward Hill, MA |
| TMACl | Tetramethylammonium chloride, obtained as a 5M solution in water |

Synthesis Example S1

Preparation of Glass Bead Layer

A temporary carrier web was prepared in a procedure as described in U.S. Pat. No. 5,474,827. The microspheres employed in all examples were 3M glass beads. A polyethylene layer (i.e., a polymeric carrier layer) was coated on a paper backing (i.e., support sheet). The polyethylene layer was heated, and glass beads with diameter in the range of 40-90 micrometers were cascaded and sunk into the polyethylene. The sink depth was smaller than the glass beads diameter, and a portion of the microspheres remained exposed above the surface of the polyethylene.

Synthesis Example S2

Preparation of Layer-by-layer Self-assembled Dielectric Mirrors Comprising Polyelectrolytes on Microspheres with a Protective Layer A coating solution of PDAC at a concentration of 20 mM (with respect to the repeat unit) was made by first adding 56.5 g of PDAC (20 wt % in water) to a 4 L plastic jug. Deionized (DI) water was then added to a mass of 3499.5 g and the solution was stirred with a magnetic stir bar for 30 min. Approximately 0.5 mL of TMAOH (25 wt % in water) was added to adjust the pH of the solution to 10.0. PDAC is a positively charged polymer, also referred to as a polycation, or polycationic material.

A coating solution of $SiO_2$ nanoparticles at a concentration of 9.6 g/L (with 48 mM TMACl) was made by first adding 84 g of $SiO_2$ (40 wt % in water) to a 4 L plastic jug. Deionized water was then added to a mass of 3457.4 g. A volume of 33.6 mL of TMACl (5 M in water) was then added dropwise with stirring. Approximately 9.0 mL of TMAOH (25 wt % in water) was added dropwise to adjust the pH of the solution to 11.5. The solution was aged overnight before use. $SiO_2$ nanoparticles possess a negative surface charge and are referred to as a polyanion, or polyanionic material.

A coating solution of $TiO_2$ nanoparticles at a concentration of 10 g/L (with 65 mM TMACl) was made by first adding 350 g of $TiO_2$ (10 wt % in water) to a 4 L plastic jug. Deionized water was then added to a mass of 3452.0 g. A volume of 45.5 mL of TMACl (5 M in water) was then added dropwise with stirring. Approximately 2.5 mL of TMAOH (25 wt % in water) was added dropwise to adjust the pH of the solution to 11.5. $TiO_2$ nanoparticles, above their isoelectric point possess a negative surface charge and are referred to as a polyanion, or polyanionic material.

The pH of the solutions/suspensions used for coating was determined using a VWR sympHony® rugged bulb pH electrode connected to a VWR sympHony® pH meter. Standard buffer solutions were used for calibration.

Layer-by-layer self-assembled coatings were made using an apparatus purchased from Svaya Nanotechnologies, Inc. (Sunnyvale, Calif.) and modeled after the system described in U.S. Pat. No. 8,234,998 (Krogman et al.) as well as Krogman et al., "Automated Process for Improved Uniformity and Versatility of Layer-by-Layer Deposition," *Langmuir* 2007, 23, 3137-3141. The apparatus comprises pressure vessels (Alloy Products Corp., Waukesha, Wis.) loaded with the coating solutions. Spray nozzles with a flat spray pattern (from Spraying Systems, Inc., Wheaton, Ill.) are mounted to spray the coating solutions/suspensions and rinse water at specified times, controlled by solenoid valves. The pressure vessels containing the coating solutions were pressurized with nitrogen to 30 psi, while the pressure vessel containing DI water was pressurized with air to 30 psi. The substrate, a carrier web as described in Synthetic Example S1 above was mounted on a vertical translation stage and held in place with a vacuum chuck. Prior to coating, the surface of the carrier web was subjected to air corona using a BD-20AC Laboratory Corona Treater (Electro-Technic Products, Inc., Chicago, Ill.) to facilitate wetting of the first layer. In a typical coating sequence, the polycation (e.g. PDAC) solution is sprayed onto the substrate while the stage moves vertically downward at 76 mm/sec. Next, after a dwell time of ~12 sec, the DI water solution is sprayed onto the substrate while the stage moves vertically upward at 102 mm/sec. Next, after a dwell time of ~4 sec, the polyanion (e.g. $SiO_2$ or $TiO_2$) solution is sprayed onto the substrate while the stage moves vertically downward at 76 mm/sec. Finally, after a dwell time of ~12 sec, the DI water solution is sprayed onto the substrate while the stage moves vertically upward at 102 mm/sec. The above sequence is repeated to deposit a desired number of "bi-layers". The coatings are generally denoted as (Polycation/Polyanion)$_x$ where x is the number of deposited "bi-layers". Here, "bi-layer" referred to the combination of a polycation layer and a polyanion layer. Coatings were dried with compressed air or nitrogen following the coating process. Multiple "bi-layers" make up a "stack".

A layer-by-layer self-assembled dielectric mirror coating was fabricated by depositing alternating high and low refractive index stacks. The individual stack thickness was targeted at an optical quarter-wave at a reference wavelength of 550 nm. The corresponding physical thickness is given by t=550 nm/(4*n), where n is the respective refractive index at 550 nm. The refractive indices for each stack were determined by ellipsometry measurements made on coatings on planar glass substrates. To fabricate a low index stack, PDAC was utilized as the polycation and SiO$_2$ nanoparticles were used as the polyanion. A low index stack comprising 6 bi-layers is denoted as (PDAC/SiO$_2$)$_6$ and was measured to have a thickness of approximately 110 nm and refractive index of approximately 1.25 at 550 nm. To fabricate a high index stack, PDAC was utilized as the polycation and TiO$_2$ nanoparticles were used as the polyanion. A high index stack comprising 10 bi-layers is denoted as (PDAC/TiO$_2$)$_{10}$ and was measured to have a thickness of approximately 70 nm and refractive index of approximately 1.95 at 550 nm. It is preferred to dry the surface of the coating between each stack using a stream of compressed air or nitrogen. A layer-by-layer self-assembled dielectric mirror with 11 total stacks was made, starting with the high index stack, and is denoted as [(PDAC/TiO$_2$)$_{10}$(PDAC/SiO$_2$)$_6$]$_5$(PDAC/TiO$_2$)$_{10}$. Odd numbered stacks are the high refractive index stacks, while even numbered stacks are the low refractive index stacks.

Synthesis Example S3

Preparation of Layer-by-layer Self-assembled Dielectric Mirrors Comprising Polyelectrolytes on Microspheres without a Protective Layer The layer-by-layer coatings of Synthetic Example S3 were made identically to those in Synthetic Example S2, except that the layer-by-layer coating started with the low index stack. Specifically, a layer-by-layer self-assembled dielectric mirror with 12 total stacks was made, starting with the low index stack, and is denoted as [(PDAC/SiO$_2$)$_6$(PDAC/TiO$_2$)$_{10}$]$_6$. Odd numbered stacks are the low refractive index stacks, while even numbered stacks are the high refractive index stacks.

Example E1 and Example E2

Self-assembled Dielectric Mirrors with and without a Protective Layer

Retroreflective articles (Example E1 and Example E2) were prepared using the following multi-step procedure. The same procedure was followed for Example E1 and Example E2 with the exception that no protective layer was coated onto the glass bead layer for Example E2.

The protective layer composition was formed by mixing together the components in Table A.

TABLE A

Protective layer composition

| Ingredient | Amount (g) |
| --- | --- |
| PE-1 | 3.72 |
| PE-2 | 1.34 |
| Silane | 0.15 |
| DBTDL | 0.1 |
| ISO | 0.3 |
| Ethyl acetate | 50.75 |

For Example E1, the protective layer composition prepared above was coated on the glass bead layer resulting from Synthesis Example S1 with a coating bar gap set at 51 micrometers (2 mils). The coating was dried at 65° C. (149° F.) for 3 min, followed by 90° C. (194° F.) for 2 min. to form a protective layer. (No protective layer was used in Example E2.)

A reflective layer was formed on the protective layer-coated glass bead layer of Example E1 according to Synthetic Example S2 and on the glass bead layer of Example E2 according to Synthesis Example S3.

A colored binder composition was prepared as a 50% solids composition by mixing together the components shown in Table B.

TABLE B

Binder layer composition

| Component | Amount (parts by weight) |
| --- | --- |
| PE-1 | 60.6 |
| PE-2 | 10.88 |
| Silane | 1.21 |
| Colorant | 6.93 |
| ISO | 2.43 |
| DBTDL | 0.121 |
| MEK | 10.88 |
| MIBK | 6.93 |

After the reflective layers were formed for Examples E1 and E2, each was coated with the colored binder composition described above, followed by a thermal treatment for 30 seconds at 71° C. (160° F.), and for 3 min at 82° C. (180° F.).

The binder coated samples prepared above were laminated to an adhesive layer coated on an aramid fabric. The adhesive layer had a wet coating thickness of 0.23 mm (9 mils) with the composition shown in Table C. The lamination was performed at approximately 104° C. (220° F.) and 70 psi (482 MPa) pressure.

TABLE C

Adhesive layer composition

| Component | Amount (parts by weight) |
| --- | --- |
| MEK | 20.8 |
| DAA | 28.2 |
| FR-1 | 7.1 |
| TPU-1 | 14.3 |
| Ox-1 | 4.3 |
| Ox-2 | 23.3 |
| ISO | 2 |

Following the lamination process, the carrier web was stripped away, exposing the previously embedded surfaces of the monolayer of glass microspheres to produce a colored exposed lens reflective article.

Wash Durability Tests:

Examples E1 and E2 were washed using the method ISO 6330 2A. The results are shown in Table 1. Example E1 shows higher retroreflectivity retention after washing due to more glass beads being retained in the article.

TABLE 1

Wash Durability with and without protective layer

| Number of wash cycles | % Retained Retroreflectivity | |
|---|---|---|
| | E1 | E2 |
| 0 | 100% | 100% |
| 5 | 100% | 49% |
| 10 | 94% | 2% |
| 15 | 85% | |
| 20 | 77% | |
| 25 | 72% | |
| 30 | 67% | |
| 35 | 65% | |
| 40 | 56% | |
| 45 | 51% | |
| 50 | 50% | |

Example E3 and Comparative Example C1

Retroreflective articles (Example E3 and Comparative Example C1) were prepared using the following multi-step procedure. The same procedure was followed for Example E3 and Comparative Example C1 with the exception that the above-described layer-by-layer self-assembly process was used to form the reflective layer of Example E3, whereas a vacuum deposited dielectric thin film stack was used to manufacture the reflective layer for Comparative Example C1.

A protective composition was formed as described above with respect to E1, the composition shown in Table A.

The protective composition was coated on the glass bead layer of E3 with a coating bar gap set at 51 micrometers (2 mils). The coating was dried at 65° C. (149° F.) for 3 min, followed by 90° C. (194° F.) for 2 min.

A reflective layer was formed on the protective layer-coated glass bead layer of Example E3 according to Synthesis Example S2.

The glass bead layer of Comparative Example C1 was vapor coated with a thin film dielectric stack consisting of alternating layers of ZnS and $CaF_2$ using an electron-beam evaporation method. The dielectric layers were deposited using a Temescal (Livermore, Calif.) electron beam gun in a Denton (Moorestown, N.J.) batch coater operating at a base pressure of approximately 0.5 mPa. The individual layer thickness was targeted at an optical quarter-wave at a reference wavelength of 550 nm. The corresponding physical thickness is given by $t=550 \text{ nm}/(4*n)$, where n is the respective refractive index at 550 nm. The refractive indices for each layer were determined by ellipsometry and spectrophotometry.

A colored binder composition was prepared as a 50% solids composition by mixing together the components shown in Table B.

After the reflective layers were formed for E3 and C1, each was coated with the colored binder composition, followed by a thermal treatment for 30 seconds at 71° C. (160° F.), and for 3 min at 82° C. (180° F.).

The binder coated samples prepared above were laminated to an adhesive layer coated on an aramid fabric. The adhesive layer had a wet coating thickness of 0.23 mm (9 mils) with the composition shown in Table C. The lamination was performed at approximately 104° C. (220° F.) and 70 psi (482 MPa) pressure.

Following the lamination process, the carrier web was stripped away, exposing the previously embedded surfaces of the monolayer of glass microspheres to produce a colored reflective article.

Wash Durability Tests:

Example E3 and Comparative Example C1 were washed using the method ISO 6330 2A. The results are shown in Table 2. Example E3 shows higher retroreflectivity retention after washing due to more glass beads being retained in the article.

TABLE 2

Wash Durability of self-assembled (E3) and vacuum-deposited (C1) dielectric mirrors

| Number of Wash Cycles | E3 | C1 |
|---|---|---|
| 0 | 100% | 100% |
| 5 | 100% | 66% |
| 10 | 94% | 57% |
| 15 | 85% | 48% |
| 20 | 77% | 44% |
| 25 | 72% | 37% |
| 30 | 67% | 36% |
| 35 | 65% | 32% |
| 40 | 56% | 29% |
| 45 | 51% | 25% |
| 50 | 50% | 23% |

Example E4 and Comparative Example C2

Retroreflective articles (Example E4 and Comparative Example C2) were prepared using the following multi-step procedure. The same procedure was followed for Example E4 and Comparative Example C2 with the exception that the above-described layer-by-layer self-assembly process was used to form the reflective layer of Example E4, whereas a vacuum deposited dielectric thin film stack was used to manufacture the reflective layer for Comparative Example C2. No protective layer was deposited prior to the reflective layer for either Example E4 or Comparative Example C2.

A reflective layer was formed on the glass bead layer Example E4 according to Synthesis Example S3.

The glass bead layer of Comparative Example C2 was vapor coated with a thin film dielectric stack consisting of alternating layers of ZnS and $CaF_2$ using an electron-beam evaporation method. The dielectric layers were deposited using a Temescal (Livermore, Calif.) electron beam gun in a Denton (Moorestown, N.J.) batch coater operating at a base pressure of approximately 0.5 mPa. The individual layer thickness was targeted at an optical quarter-wave at a reference wavelength of 550 nm. The corresponding physical thickness is given by $t=550 \text{ nm}/(4*n)$, where n is the respective refractive index at 550 nm. The refractive indices for each layer were determined by ellipsometry and spectrophotometry. For Comparative Example 3 a total of six quarter-wave layers ($CaF_2$, ZnS, $CaF_2$, ZnS, $CaF_2$, ZnS) were deposited.

A colored binder composition was prepared as a 50% solids composition by mixing together the components shown in Table B.

After the reflective layers were formed for E4 and C2, each was coated with the colored binder composition described above, followed by a thermal treatment for 30 seconds at 71° C. (160° F.), and for 3 min at 82° C. (180° F.).

The binder coated samples prepared above were laminated to an adhesive layer coated on an aramid fabric. The adhesive layer had a wet coating thickness of 0.23 mm (9 mils) with the composition shown in Table C. The lamination was performed at approximately 104° C. (220° F.) and 70 psi (482 MPa) pressure.

Following the lamination process, the carrier web was stripped away, exposing the previously embedded surfaces of the monolayer of glass microspheres to produce a colored reflective article.

The color luminance (Y) and coefficient of retroreflection ($R_A$; in $cd/lux/m^2$) for Example E4 and Comparative Example C2 are shown in Table 3. Example E4 exhibited superior color luminance and increased retroreflectivity over Comparative Example C2.

TABLE 3

Color Luminance (Y) and Coefficient of Retroreflection
($R_A$; in $cd/lux/m^2$)

|  | E4 | C2 |
|---|---|---|
| Y | 86.7 | 82.9 |
| $R_A$ | 451 | 420 |

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure.

All references and publications cited herein are expressly incorporated herein by reference in their entirety into this disclosure.

Various features and aspects of the present disclosure are set forth in the following claims.

What is claimed is:

1. An exposed lens retroreflective article comprising:
a binder layer;
a layer of transparent microspheres partially embedded in the binder layer; and
a reflective layer disposed between the binder layer and the microspheres, the reflective layer comprising a dielectric mirror, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group.

2. The retroreflective article of claim 1, wherein the dielectric mirror comprises a polyelectrolyte.

3. The retroreflective article of claim 1 wherein one of the first material and the second material includes a polycation and the other of the first material and the second material includes a polyanion.

4. The retroreflective article of claim 1 wherein at least one of the first material and the second material includes a polyelectrolyte.

5. The retroreflective article of claim 1 wherein the first material includes a polyelectrolyte and the second material includes nanoparticles.

6. The retroreflective article of claim 1 wherein each bilayer includes a polyelectrolyte.

7. The retroreflective article of claim 1 wherein each bilayer includes nanoparticles.

8. The retroreflective article of claim 1 wherein one of the first stack and the second stack comprises silica nanoparticles, and wherein the other of the first stack and the second stack comprises titania nanoparticles.

9. The retroreflective article of any claim 1 wherein the first stack includes at least one first bilayer comprising a polyelectrolyte, and wherein the second stack includes at least one second bilayer comprising a polyelectrolyte.

10. The retroreflective article of claim 9, wherein the at least one first bilayer and the at least one second bilayer each comprise a first monolayer having a positive or negative surface charge and an adjacent second monolayer having the opposite surface charge of the first monolayer.

11. The retroreflective article of claim 10, wherein the first monolayer comprises a polymer and the second monolayer comprises nanoparticles.

12. The retroreflective article of claim 1 wherein the first stack is a low refractive index stack comprising low refractive index bilayers and the second stack is a high refractive index stack comprising high refractive index bilayers.

13. The retroreflective article of claim 12, wherein the low refractive index bilayers and the high refractive index bilayers each include a polyelectrolyte and nanoparticles.

14. The retroreflective article of claim 1 wherein the first stack has a first refractive index $n_1$, and the second stack has a second refractive index $n_2$ that is different from the first refractive index $n_1$.

15. The retroreflective article of claim 14, wherein $n_1$ and $n_2$ differ by at least 0.4.

16. The retroreflective article of claim 1 wherein the binder layer includes a colorant.

17. The retroreflective article of claim 1 further comprising a protective layer disposed in at least one of: (i) between the reflective layer and the layer of microspheres; and (ii) in a lateral space between laterally spaced apart microspheres.

18. The retroreflective article of claim 17, wherein the protective layer forms a portion of the reflective layer.

19. A transfer article comprising:
a carrier web having a first major surface and a second major surface opposite the first major surface;
a layer of transparent microspheres partially embedded in the first major surface of the carrier web;
a reflective layer disposed over the microspheres and the first major surface of the carrier web, the reflective layer comprising a dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and
a binder layer disposed over the reflective layer.

20. A method of making a retroreflective article, the method comprising:
partially embedding a plurality of transparent microspheres in a carrier web;

applying a dielectric mirror to the exposed portions of the microspheres to form a reflective layer, the dielectric mirror comprising a first stack and a second stack positioned in planar contact with the first stack, wherein each of the first stack and the second stack comprises at least one bilayer, wherein each bilayer comprises a first material with a first bonding group and a second material with a complementary second bonding group; and applying a binder composition to the reflective layer to form a binder layer.

* * * * *

UNITED STATES PATENT AND TRADEMARK OFFICE
CERTIFICATE OF CORRECTION

PATENT NO. : 10,054,724 B2
APPLICATION NO. : 15/504037
DATED : August 21, 2018
INVENTOR(S) : Michael McCoy et al.

Page 1 of 1

It is certified that error appears in the above-identified patent and that said Letters Patent is hereby corrected as shown below:

In the Specification

Column 5
Line 48, delete "layer;" and insert -- layer. --, therefor.
Line 56, delete "acids);" and insert -- acids). --, therefor.

Column 10
Lines 2-3, delete "vinylbenzyltriamethylamine)." and insert -- vinylbenzyltrimethylamine). --, therefor.

Column 21
Line 19, delete "Discontinous" and insert -- Discontinuous --, therefor.
Line 33, delete "and or" and insert -- and/or --, therefor.

Column 32
Line 18, delete "article;" and insert -- article. --, therefor.

In the Claims

Column 41
Line 62, in Claim 2, delete "1," and insert -- 1 --, therefor.

Column 42
Line 16, in Claim 9, after "of" delete "any".

Signed and Sealed this
Thirteenth Day of November, 2018

Andrei Iancu
*Director of the United States Patent and Trademark Office*